(12) United States Patent
Kida et al.

(10) Patent No.: US 9,395,832 B2
(45) Date of Patent: Jul. 19, 2016

(54) DISPLAY PANEL WITH TOUCH DETECTION FUNCTION, METHOD OF DRIVING THE SAME, DRIVE CIRCUIT, AND ELECTRONIC UNIT

(71) Applicant: Japan Display Inc., Tokyo (JP)

(72) Inventors: Yoshitoshi Kida, Kanagawa (JP); Koji Noguchi, Kanagawa (JP); Hiroshi Mizuhashi, Tokyo (JP); Kohei Azumi, Tokyo (JP)

(73) Assignee: Japan Display Inc., Tokyo (JP)

( * ) Notice: Subject to any disclaimer, the term of this patent is extended or adjusted under 35 U.S.C. 154(b) by 276 days.

(21) Appl. No.: 14/283,863

(22) Filed: May 21, 2014

(65) Prior Publication Data

US 2014/0253485 A1    Sep. 11, 2014

Related U.S. Application Data

(62) Division of application No. 13/420,672, filed on Mar. 15, 2012, now Pat. No. 9,285,904.

(30) Foreign Application Priority Data

Apr. 13, 2011 (JP) .................. 2011-089431

(51) Int. Cl.
G06F 3/041 (2006.01)
G06F 3/044 (2006.01)
G02F 1/1333 (2006.01)

(52) U.S. Cl.
CPC .............. G06F 3/041 (2013.01); G06F 3/044 (2013.01); G06F 3/0412 (2013.01); G02F 1/13338 (2013.01)

(58) Field of Classification Search
None
See application file for complete search history.

(56) References Cited

U.S. PATENT DOCUMENTS

| 5,565,658 | A | 10/1996 | Gerpheide et al. |
| 2009/0256818 | A1 | 10/2009 | Noguchi et al. |
| 2009/0278824 | A1* | 11/2009 | Choi .................... H04N 9/3155 345/204 |
| 2010/0295824 | A1* | 11/2010 | Noguchi ............. G02F 1/13338 345/175 |

(Continued)

FOREIGN PATENT DOCUMENTS

| CN | 101893957 A | 11/2010 |
| JP | 10-124256 | 5/1998 |

(Continued)

OTHER PUBLICATIONS

U.S. PTO Office Action issued Sep. 16, 2014 for related U.S. Appl. No. 13/420,672.

(Continued)

*Primary Examiner* — Joseph Haley
*Assistant Examiner* — Ifedayo Iluyomade
(74) *Attorney, Agent, or Firm* — Michael Best & Friedrich LLP

(57) ABSTRACT

There are provided a display panel with a touch detection function and a method of driving the same, a drive circuit, as well as an electronic unit, which make it possible to reduce an influence of a disturbance noise. The display panel includes: a signal generation section selecting one pulse period from a plurality of pulse periods prepared beforehand, and generating a synchronization signal including a series of pulses appearing at the selected pulse period; a display section performing display based on the synchronization signal; and a touch detection section performing touch detection operation based on the synchronization signal.

14 Claims, 20 Drawing Sheets

(56) References Cited

U.S. PATENT DOCUMENTS

| | | | |
|---|---|---|---|
| 2011/0128254 A1 | 6/2011 | Teranishi et al. | |
| 2011/0157064 A1* | 6/2011 | Imai .................... | G06F 3/0416 345/173 |
| 2013/0021283 A1 | 1/2013 | Nishimura et al. | |

FOREIGN PATENT DOCUMENTS

| | | |
|---|---|---|
| JP | 11-505641 | 5/1999 |
| JP | 2006-106853 | 4/2006 |
| JP | 2009-244958 | 10/2009 |
| JP | 2009-258182 A | 11/2009 |
| WO | WO-2010/024179 A1 | 3/2010 |

OTHER PUBLICATIONS

U.S. PTO Final Office Action issued May 15, 2015 for related U.S. Appl. No. 13/420,672.

Japanese Office Action dated Jul. 1, 2014 for corresponding Japanese Application No. 2011-089431.

Chinese Office Action issued Dec. 21, 2015 for corresponding Chinese Application No. 201210099865.9.

Chinese Office Action issued Nov. 2, 2015 for corresponding Chinese No. 201210099865.9.

* cited by examiner

DISPLAY PANEL WITH TOUCH DETECTION FUNCTION, METHOD OF DRIVING THE SAME, DRIVE CIRCUIT, AND ELECTRONIC UNIT

CROSS REFERENCES TO RELATED APPLICATIONS

This is a Divisional Application of U.S. application Ser. No. 13/420,672, filed Mar. 15, 2012, which claims priority from Japanese Priority Patent Application JP 2011-089431 filed in the Japan Patent Office on Apr. 13, 2011, the entire contents of which are hereby incorporated by reference.

BACKGROUND

The present disclosure relates to a display panel with a touch detection function which detects a touch event by an external proximity object, and a method of driving the same, a drive circuit, as well as an electronic unit having such a display panel with a touch detection function.

In recent years, attention has been given to a display panel configured by mounting a contact sensing device, a so-called touch panel, on a display such as a liquid crystal display or the like, or integrating the touch panel and the display, thereby causing the display to display various button images and the like to enable information input, in place of ordinary mechanical buttons. The display panel having such a touch panel is allowed not to have an input device such as a keyboard, a mouse, or a keypad and therefore, there is a growing trend to use the display panel in a portable information terminal such as a portable telephone, in addition to a computer.

There are types of touch panels including an optical type, a resistive type, and a capacitance type. For example, Japanese Unexamined Patent Application Publication No. 2009-244958 has proposed a so-called in-cell type display panel with a touch detection function. According to this document, a common electrode for display originally provided in a display is used as one of a pair of touch sensor electrodes, and the other (a touch detection electrode) is disposed to intersect this common electrode, in a capacitance-type touch panel. Meanwhile, there have been proposed some display panels each provided with a touch detection function, of a so-called on-cell type, in which a touch panel is formed on a display surface of a display.

Incidentally, in a touch panel in general, a human body serves as an antenna for a noise caused by an inverter fluorescent lamp, AM wave, AC power, and the like (hereinafter referred to as a disturbance noise), and the noise might be transmitted to the touch panel, causing a malfunction. Some studies have been made to reduce an influence of such a disturbance noise. For example, a touch panel allowed to change the frequency of a drive signal used in touch detection operation has been suggested in Japanese Unexamined Patent Application Publication No. 2006-106853. When a disturbance noise is at a specific frequency, this touch panel attempts to improve an S/N ratio by changing the frequency of the drive signal.

SUMMARY

Such a reduction in the influence of the disturbance noise is expected in not only a touch panel but also a display panel with a touch detection function. However, Japanese Unexamined Patent Application Publication No. 2006-106853 provides no description about measures against the disturbance noise in a display panel with a touch detection function.

In view of the foregoing, it is desirable to provide a display panel with a touch detection function and a method of driving the same, a drive circuit, as well as an electronic unit, which make it possible to reduce an influence of a disturbance noise.

According to an embodiment of the present disclosure, there is provided a display panel with a touch detection function, the display panel including a signal generation section, a display section, and a touch detection section. The signal generation section selects one pulse period from a plurality of pulse periods prepared beforehand, and generates a synchronization signal including a series of pulses appearing at the selected pulse period. The display section performs display based on the synchronization signal. The touch detection section performs touch detection operation based on the synchronization signal.

According to another embodiment of the present disclosure, there is provided a method of driving a display panel with a touch detection function, the method including: selecting one pulse period from a plurality of pulse periods prepared beforehand, and generating a synchronization signal that includes a series of pulses appearing at the selected pulse period. The method further includes: performing display for one screen, and performing touch detection operation, based on the series of pulses of the synchronization signal; and switching display of a screen, for each predetermined frame period.

According to another embodiment of the present disclosure, there is provided a drive circuit including a signal generation section, a display drive section, and a touch-detection drive section. The signal generation section selects one pulse period from a plurality of pulse periods prepared beforehand, and generates a synchronization signal that includes a series of pulses appearing at the selected pulse period. The display drive section drives a display panel based on the synchronization signal. The touch-detection drive section drives a touch panel based on the synchronization signal.

According to another embodiment of the present disclosure, there is provided an electronic unit including a display panel with a touch detection function and a control section performing operation control using the display panel. The display panel includes: a signal generation section selecting one pulse period from a plurality of pulse periods prepared beforehand, and generating a synchronization signal including a series of pulses appearing at the selected pulse period; a display section performing display based on the synchronization signal; and a touch detection section performing touch detection operation based on the synchronization signal. For example, a television receiver, a digital camera, a personal computer, a video camera, or a portable terminal device such as a portable telephone corresponds to this electronic unit.

In the display panel with a touch detection function, the method of driving the same, the drive circuit, and the electronic unit according to the above-described embodiments of the present disclosure, the display is performed based on the synchronization signal, and the touch detection operation is performed at the timing synchronized with the synchronization signal. At the time, the pulse period of the series of pulses included in this synchronization signal is configured to be changeable. Thus, when the pulse period of the synchronization signal changes, operation timing of each of the display operation and the touch detection operation changes accordingly.

According to the display panel with a touch detection function, the method of driving the same, the drive circuit, and the electronic unit in the above-described embodiments of the present disclosure, one pulse period is selected from the plurality of pulse periods prepared beforehand and thus, it is possible to reduce an influence of a disturbance noise.

It is to be understood that both the foregoing general description and the following detailed description are exemplary, and are intended to provide further explanation of the technology as claimed.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the technology.

DETAILED DESCRIPTION

An embodiment of the present disclosure will be described below in detail with reference to the drawings. Incidentally, the description will be provided in the following order.
1. Basic Principle of Capacitance-Type Touch Detection
2. Embodiment
3. Application Examples 1. Basic Principle of Capacitance-Type Touch Detection At first, with reference to Parts (A) and (B) of each of FIG. 1 to FIG. 3, there will be described a basic principle of touch detection in a display panel with a touch detection function according to an embodiment of the present disclosure. This touch detection scheme is embodied as a capacitance-type touch sensor, and forms a capacitive element by using, as illustrated in, for example, Part (A) of FIG. 1, a pair of opposed electrodes (a drive electrode E1 and a touch detection electrode E2) with a dielectric body D in between. This structure is expressed as an equivalent circuit illustrated in Part (B) of FIG. 1. A capacitive element C1 is configured by using the drive electrode E1, the touch detection electrode E2, and the dielectric body D. Of the capacitive element C1, one end is connected to an AC-signal source (drive signal source) S, and the other end P is grounded via a resistor R and also connected to a voltage detector (touch detection circuit) DET. When an AC rectangular wave Sg (Part (B) of FIG. 3) of a predetermined frequency (for example, around several kHz to tens kHz) is applied to the drive electrode E1 (the one end of the capacitive element C1) from the AC-signal source S, an output waveform (a touch detection signal Vdet) as illustrated in Part (A) of FIG. 3 appears in the touch detection electrode E2 (the other end P of the capacitive element C1). It is to be noted that this AC rectangular wave Sg is equivalent to an AC drive signal VcomAC to be described later.

Figure 1:
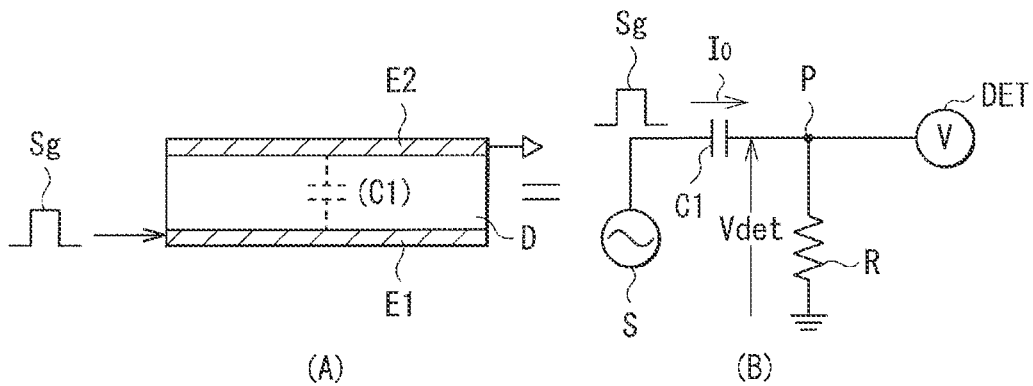
FIGS. 1A-B are diagrams for explaining a basic principle of a touch detection scheme in a display panel with a touch detection function according to an embodiment of the present disclosure, and illustrate a state in which there is no touch or approach of a finger.

In a state in which there is no touch (or approach) of a finger, an electric current I0 according to a capacitance value of the capacitive element C1 flows, accompanying charge and discharge for the capacitive element C1, as illustrated in Parts (A) and (B) of FIG. 1. An electric potential waveform at the other end P of the capacitive element C1 at this moment is, for example, like a waveform V0 in Part (A) of FIG. 3, and this is detected by the voltage detector DET.

Figure 2:
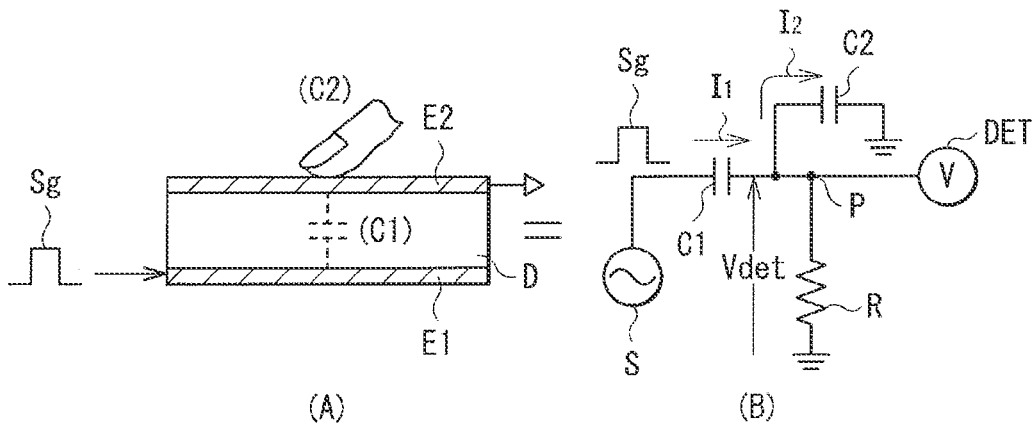
FIGS. 2A-B are diagrams for explaining the basic principle of the touch detection scheme in the display panel with a touch detection function according to the embodiment of the present disclosure, and illustrate a state in which there is a touch or an approach of the finger.
Figure 3:
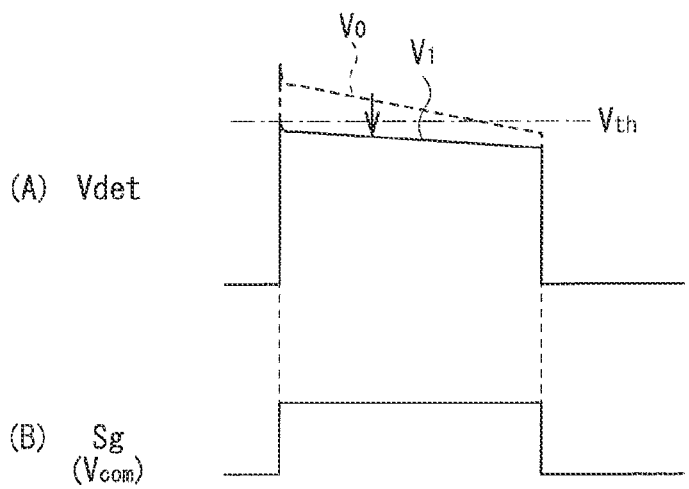
FIGS. 3A-B are diagrams for explaining the basic principle of the touch detection scheme in the display panel with a touch detection function according to the embodiment of the present disclosure, and illustrate an example of a waveform of a drive signal and an example of a waveform of a touch detection signal, respectively.

On the other hand, in a state in which there is a touch (or an approach) of a finger, a capacitive element C2 formed by the finger is added to the capacitive element C1 in series, as illustrated in Parts (A) and (B) of FIG. 2. In this state, currents I1 and I2 flow, accompanying charge and discharge for the capacitive elements C1 and C2, respectively. An electric potential waveform at the other end P of the capacitive element C1 at this moment is, for example, like a waveform V1 in Part (A) of FIG. 3, and this is detected by the voltage detector DET. At the time, the electric potential of the point P is a partial pressure potential determined by the values of the currents I1 and I2 flowing through the capacitive elements C1 and C2. For this reason, the waveform V1 is a value smaller than the waveform V0 in a noncontact state. The voltage detector DET compares the detected voltage with a predetermined threshold voltage Vth, and determines that the noncontact state is established when the detected voltage is equal to or higher than this threshold voltage, and on the other hand, determines that a contact state is established when the detected voltage is lower than this threshold voltage. In this way, the touch detection is enabled.

2. Embodiment

Configuration Example

Overall Configuration Example

Figure 4:
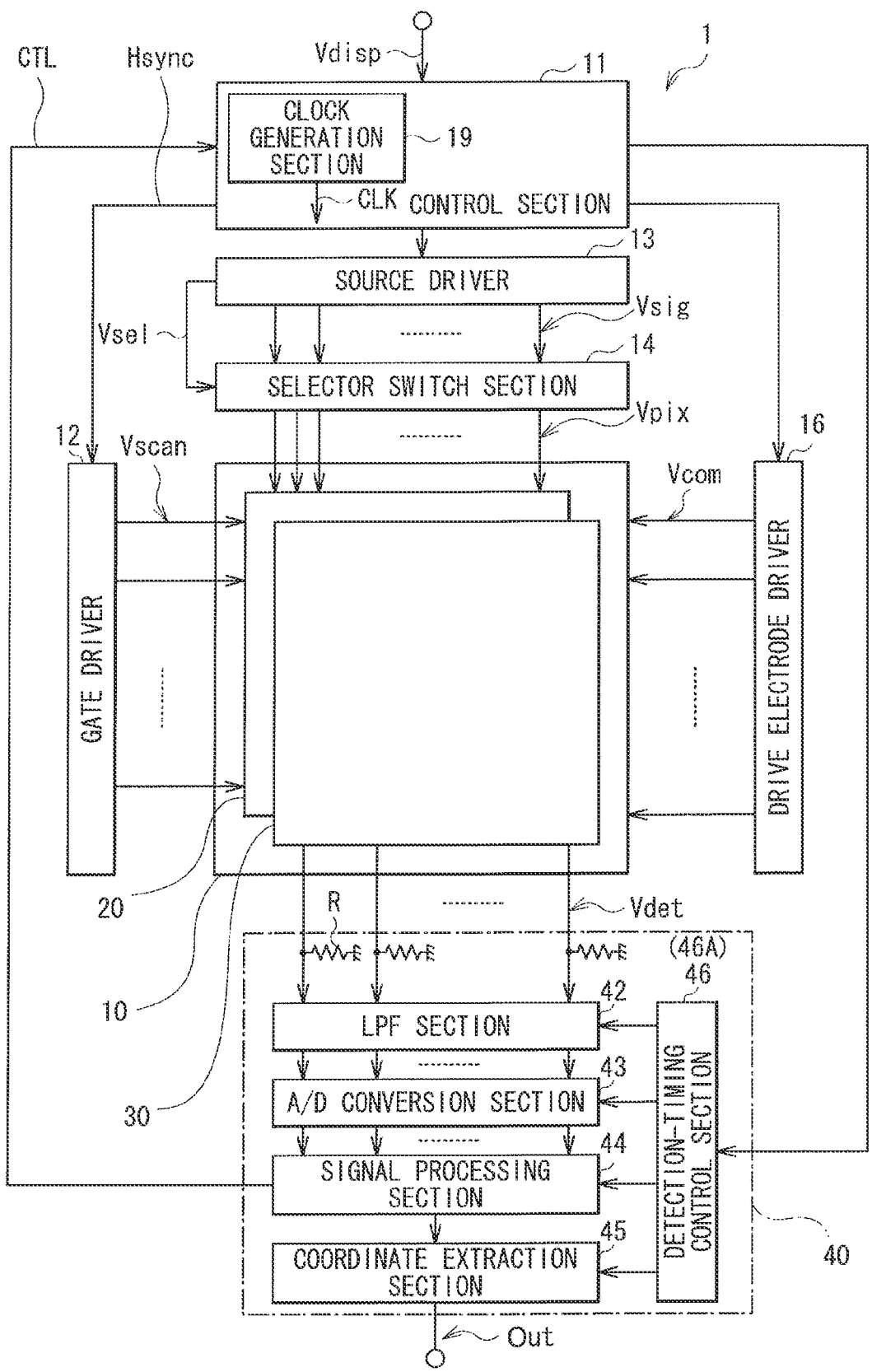
FIG. 4 is a block diagram illustrating a configuration example of a display panel with a touch detection function according to an embodiment of the present disclosure.

FIG. 4 illustrates a configuration example of a display panel with a touch detection function 1 according to an embodiment of the present disclosure. This display panel with a touch detection function 1 is of a so-called in-cell type, in which a liquid crystal element is used as a display element, and a liquid crystal display device configured by using the liquid crystal element and a capacitance touch detection device are integrated.

This display panel with a touch detection function 1 includes a control section 11, a gate driver 12, a source driver 13, a selector switch section 14, a drive electrode driver 16, a display device with a touch detection function 10, and a touch detection section 40.

The control section 11 is a circuit that supplies a control signal to each of the gate driver 12, the source driver 13, the drive electrode driver 16, and the touch detection section 40, based on an image signal Vdisp supplied externally, thereby controlling these elements to operate in synchronization with one other. Specifically, the control section 11 supplies a horizontal synchronization signal Hsync to the gate driver 12, supplies an image signal and a source-driver control signal to the source driver 13, supplies a drive-electrode-driver control signal to the drive electrode driver 16, and supplies a touch-detection control signal to the touch detection section 40. The horizontal synchronization signal Hsync includes a pulse P arranged at a predetermined pulse period (one horizontal period) as will be described later. The control section 11 has a clock generation section 19 that generates a base clock CLK, and the control section 11 generates these control signals based on this base clock CLK. Further, the control section 11 has a function of changing the length of the pulse period of the pulse P included in the horizontal synchronization signal Hsync (the length of the one horizontal period) based on a period control signal CTL supplied from the touch detection section 40, as will be described later.

The gate driver 12 has a function of sequentially selecting one horizontal line targeted for display driving of the display device with a touch detection function 10, based on the horizontal synchronization signal Hsync supplied from the control section 11. Specifically, the gate driver 12 generates a scanning signal Vscan synchronized with the pulse P included in the horizontal synchronization signal Hsync, and applies the scanning signal Vscan to a gate of a TFT element Tr of a pixel Pix via a scanning signal line GCL, thereby sequentially selecting one row (one horizontal line) of the pixels Pix formed in a matrix in a liquid-crystal display device 20 of the display device with a touch detection function 10, as a target for the display driving.

The source driver 13 generates and outputs a pixel signal Vsig, based on the image signal and the source-driver control signal supplied from the control section 11. Specifically, as will be described later, the source driver 13 generates the pixel signal Vsig from the image signal for one horizontal line, and supplies the generated pixel signal Vsig to the selector switch section 14. The pixel signal Vsig is obtained by time-divisionally multiplexing pixel signals Vpix of a plurality of (three in this example) subpixels SPix of the liquid crystal display device 20 of the display device with a touch detection function 10. In addition, the source driver 13 has a function to generate a switch control signal Vsel (VselR, VselG, and VselB) desired for multiplexing the pixel signals Vpix multiplexed into the pixel signal Vsig, and supply the generated switch control signal Vsel together with the pixel signal Vsig to the selector switch section 14. It is to be noted that this multiplexing is performed to reduce the number of wires between the source driver 13 and the selector switch section 14.

The selector switch section 14 demultiplexes the pixel signals Vpix which have been time-divisionally multiplexed into the pixel signal Vsig, based on the pixel signal Vsig and the switch control signal Vsel supplied from the source driver 13, and supplies the demultiplexed pixel signals Vpix to the liquid crystal display device 20 of the display device with a touch detection function 10.

Figure 5:
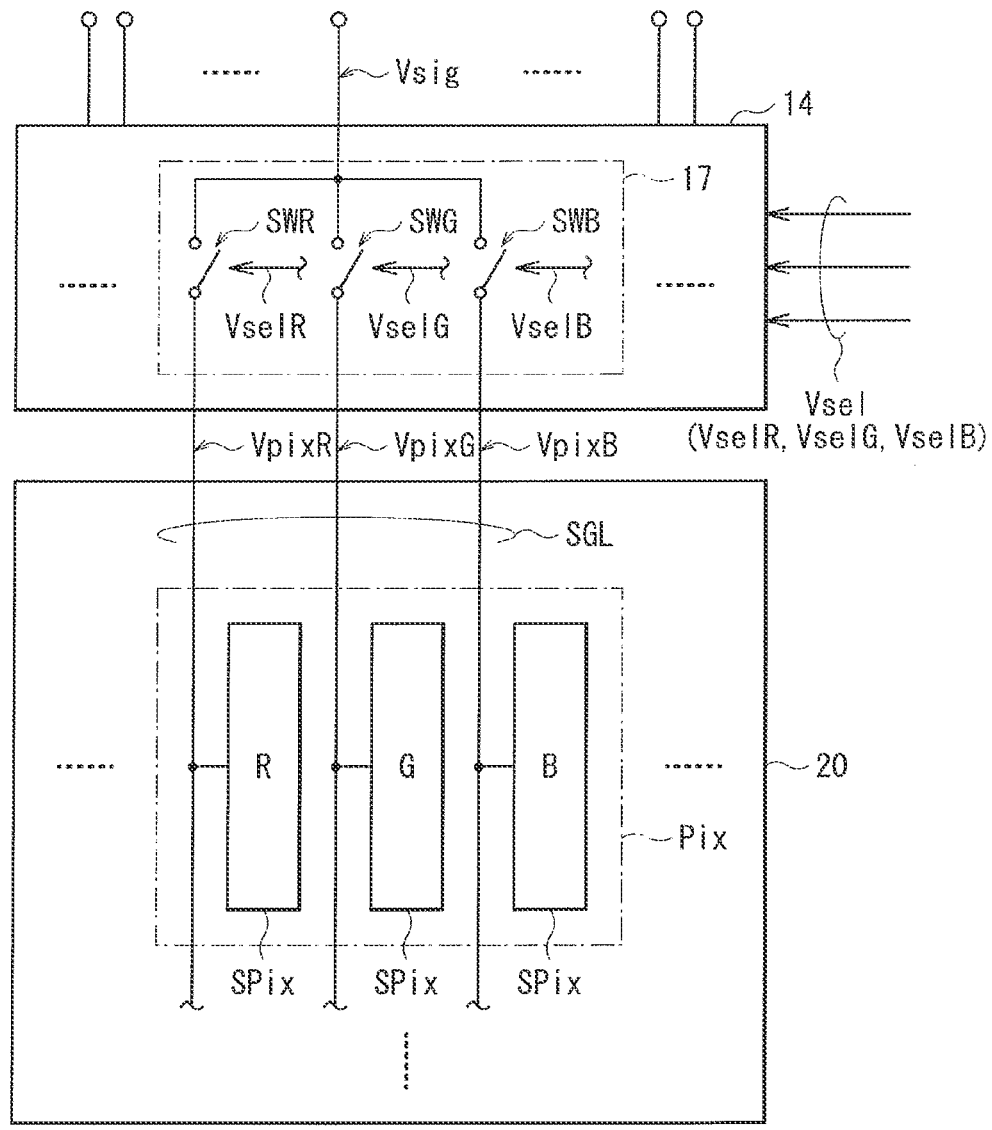
FIG. 5 is a block diagram illustrating a configuration example of a selector switch section illustrated in FIG. 4.

FIG. 5 illustrates a configuration example of the selector switch section 14. The selector switch section 14 has a plurality of switch groups 17. Each of the switch groups 17 has three switches SWR, SWG, and SWB in this example, and one end of the respective switches are connected to one another and supplied with the pixel signal Vsig from the source driver 13, and the other ends are connected to the three subpixels SPix (R, G, and B) related to the pixel Pix, respectively, via a pixel signal line SGL of the liquid crystal display device 20 in the display device with a touch detection function 10. These three switches SWR, SWG, and SWB are controlled to be ON/OFF by the switch control signal Vsel (VselR, VselG, and VselB) supplied from the source driver 13. Based on this configuration, the selector switch section 14 functions to demultiplex the pixel signals Vpix (VpixR, VpixG, and VpixB) from the pixel signal Vsig resulting form the multiplexing, by sequentially and time-divisionally switching these three switches SWR, SWG, and SWB according to this switch control signal Vsel to allow these switches to be in an ON state. Then, the selector switch section 14 supplies these pixel signals Vpix to the three subpixels SPix.

The drive electrode driver 16 is a circuit that supplies the drive signal Vcom to drive electrodes COML (to be described later) of the display device with a touch detection function 10, based on the drive-electrode-driver control signal supplied from the control section 11. Specifically, in touch detection operation, the drive electrode driver 16 applies the AC drive signal VcomAC synchronized with the horizontal synchronization signal Hsync to the drive electrode COML related to the touch detection operation. At the time, the drive electrode driver 16 drives the drive electrodes COML for each block (a drive electrode block B to be described later) including a predetermined number of the drive electrodes COML. Further, the drive electrode driver 16 applies a DC drive signal VcomDC to the drive electrodes COML to which the AC drive signal VcomAC is not applied.

The display device with a touch detection function 10 is a display device with the built-in touch detection function. The display device with a touch detection function 10 has the liquid-crystal display device 20 and a touch detection device 30. The liquid-crystal display device 20 is, as will be described later, a device that performs display by sequentially scanning the horizontal lines one by one, according to the scanning signal Vscan supplied from the gate driver 12. The touch detection device 30 operates based on the above-described basic principle of the capacitance-type touch detection, and outputs the touch detection signal Vdet. This touch detection device 30 is, as will be described later, configured to perform sequential scanning according to the AC drive signal VcomAC supplied from the drive electrode driver 16, and thereby performing the touch detection.

The touch detection section 40 is a circuit that detects the presence or absence of a touch event on the touch detection device 30, based on the touch-detection control signal supplied from the control section 11 and the touch detection signal Vdet supplied from the touch detection device 30 of the display device with a touch detection function 10, and determines, when there is a touch event, its coordinates or the like in a touch detection region. This touch detection section 40 has a LPF (Low Pass Filter) section 42, an A/D conversion section 43, a signal processing section 44, a coordinate extraction section 45, and a detection-timing control section 46. The LPF section 42 is a low-pass analog filter that removes a high frequency component (noise component) included in the touch detection signal Vdet supplied from the touch detection device 30, and extracts and outputs each touch component. Between each input terminal of the LPF section 42 and grounding, resistance R to give a DC potential (e.g., 0 V) is connected. It is to be noted that, for example, a switch may be provided in place of this resistance R, and a DC potential (0 V) may be applied by allowing this switch to be an ON state at a predetermined time. The A/D conversion section 43 is a circuit that samples each analog signal outputted from the LPF section 42 at timing synchronized with the AC drive signal VcomAC, and converts the analog signal into a digital signal. The signal processing section 44 is a logical circuit that detects the presence or absence of a touch event on the touch detection device 30, based on an output signal of the A/D conversion section 43. Further, this signal processing section 44 also has a function to detect the presence or absence of a disturbance noise based on the output signal of the A/D conversion section 43, and when the disturbance noise is detected, order the control section 11 to change the pulse period of the pulse P in the horizontal synchronization signal Hsync, via the period control signal CTL. The coordinate extraction section 45 is a logical circuit that determines, when the touch is detected in the signal processing section 44, its touch-panel coordinates. The detection-timing control section 46 controls these circuits to operate in synchronization with each other.

[Display Device with Touch Detection Function 10]

Next, a configuration example of the display device with a touch detection function 10 will be described in detail.

Figure 6:
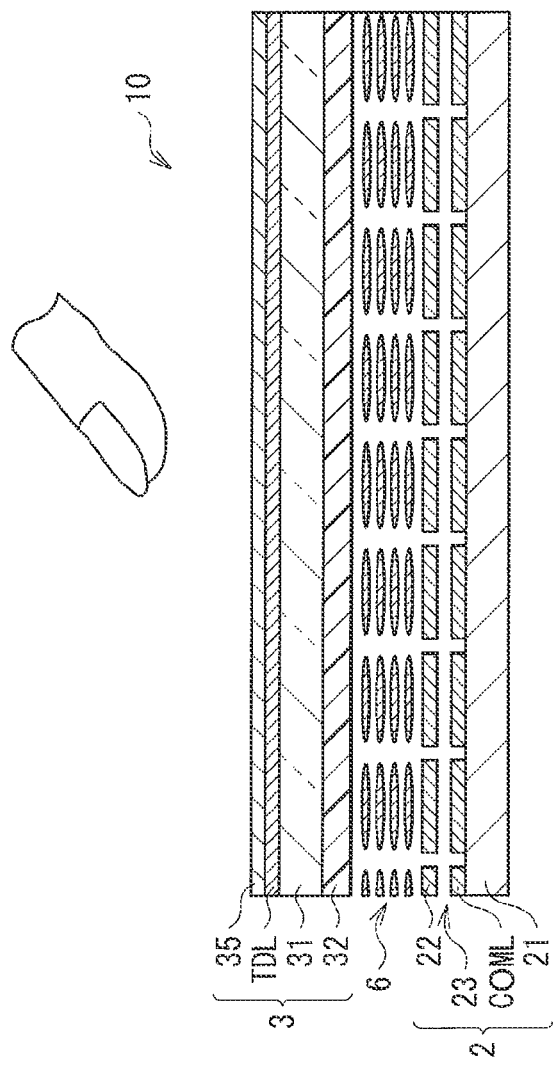
FIG. 6 is a cross-sectional diagram illustrating a schematic sectional structure of a display device with a touch detection function illustrated in FIG. 4.

FIG. 6 illustrates an example of a cross-sectional structure of a main part in the display device with a touch detection function 10. This display device with a touch detection function 10 includes a pixel board 2, an opposite board 3 disposed to face this pixel board 2, and a liquid crystal layer 6 interposed between the pixel board 2 and the opposite board 3.

The pixel board 2 has a TFT board 21 serving as a circuit board, the drive electrodes COML, and pixel electrodes 22. The TFT board 21 functions as a circuit board where various electrodes, wires, thin film transistors (TFTs), and the like are formed. The TFT board 21 is made of, for example, glass. Formed on the TFT board 21 is the drive electrodes COML. The drive electrode COML is an electrode to supply a voltage common to the pixels Pix (to be described later). This drive electrode COML functions as a common drive electrode for liquid-crystal-display operation, and also functions as a drive electrode for touch detection operation. Formed on the drive electrodes COML is an insulating layer 23, and the pixel electrodes 22 are formed on the insulating layer 23. The pixel electrode 22 is an electrode to supply a pixel signal for display, and has translucency. The drive electrode COML and the pixel electrode 22 are made of, for example, ITO (Indium Tin Oxide).

The opposite board 3 has a glass substrate 31, a color filter 32, and a touch detection electrode TDL. The color filter 32 is formed on one surface of the glass substrate 31. This color filter 32 is configured, for example, by periodically arranging color filter layers of three colors of red (R), green (G), and blue (B), and one set of the three colors of R, G, and B is associated with each display pixel. Formed on the other surface of the glass substrate 31 is the touch detection electrode TDL. The touch detection electrode TDL is an electrode made of, for example, ITO, and has translucency. On this touch detection electrode TDL, a polarizing plate 35 is disposed.

The liquid crystal layer 6 functions as a display functional layer, and modulates light passing therethrough according to the state of an electric field. This electric field is formed by a potential difference between a voltage of the drive electrode COML and a voltage of the pixel electrode 22. A liquid crystal in a transverse electric field mode, such as FFS (Fringe Field Switching) and IPS (In Plane Switching) is used in the liquid crystal layer 6.

It is to be noted that each of between the liquid crystal layer 6 and the pixel board 2, and between the liquid crystal layer 6 and the opposite board 3, an oriented film is disposed, and an incidence-side polarizing plate is disposed on the undersurface side of the pixel board 2, but the illustration is omitted here.

Figure 7:
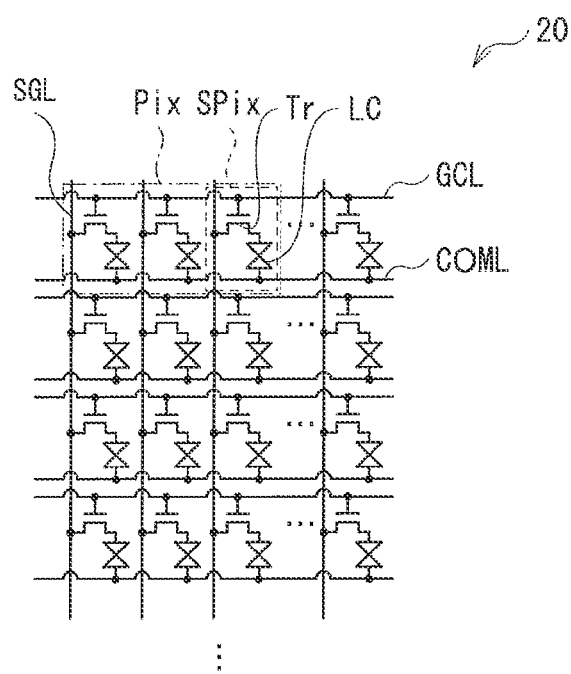
FIG. 7 is a circuit diagram illustrating a pixel arrangement in the display device with a touch detection function illustrated in FIG. 4.

FIG. 7 illustrates a configuration example of a pixel structure in the liquid-crystal display device 20. The liquid-crystal display device 20 has the pixels Pix arranged in a matrix. Each of the pixels Pix is configured to include the three subpixels SPix. These three subpixels SPix are arranged to correspond to the three colors (RGB) of the color filter 32 illustrated in FIG. 6, respectively. The subpixel SPix has the TFT element Tr and a liquid crystal element LC. The TFT element Tr is configured by using a thin-film transistor and, in this example, configured by using an n-channel MOS (Metal Oxide Semiconductor) TFT. Of the TFT element Tr, a source is connected to the pixel signal line SGL, a gate is connected to the scanning signal line GCL, and a drain is connected to one end of the liquid crystal element LC. As for the liquid crystal element LC, one end is connected to a drain of the TFT element Tr, and the other end is connected to the drive electrode COML.

The subpixel SPix is connected to other subpixels SPix belonging to the same row of the liquid-crystal display device 20, by the scanning signal line GCL. The scanning signal line GCL is connected to the gate driver 12, and supplied with the scanning signal Vscan from the gate driver 12. In addition, the subpixel SPix is connected to other subpixels SPix belonging to the same column of the liquid-crystal display device 20, by the pixel signal line SGL. The pixel signal line SGL is connected to the selector switch section 14, and supplied with the pixel signal Vpix from the selector switch section 14.

Further, the subpixel SPix is connected to other subpixels SPix belonging to the same row of the liquid-crystal display device 20, by the drive electrode COML. The drive electrode COML is connected to the drive electrode driver 16, and supplied with the drive signal Vcom (DC drive signal VcomDC) from the drive electrode driver 16.

With this configuration, in the liquid-crystal display device 20, the gate driver 12 drives the scanning signal line GCL to perform the line sequential scanning time-divisionally, and thereby one horizontal line is selected sequentially, and the pixels Pix belonging to the selected one horizontal line are supplied with the pixel signal Vpix from the source driver 13 and the selector switch section 14, and thereby display is performed for every one horizontal line.

Figure 8:
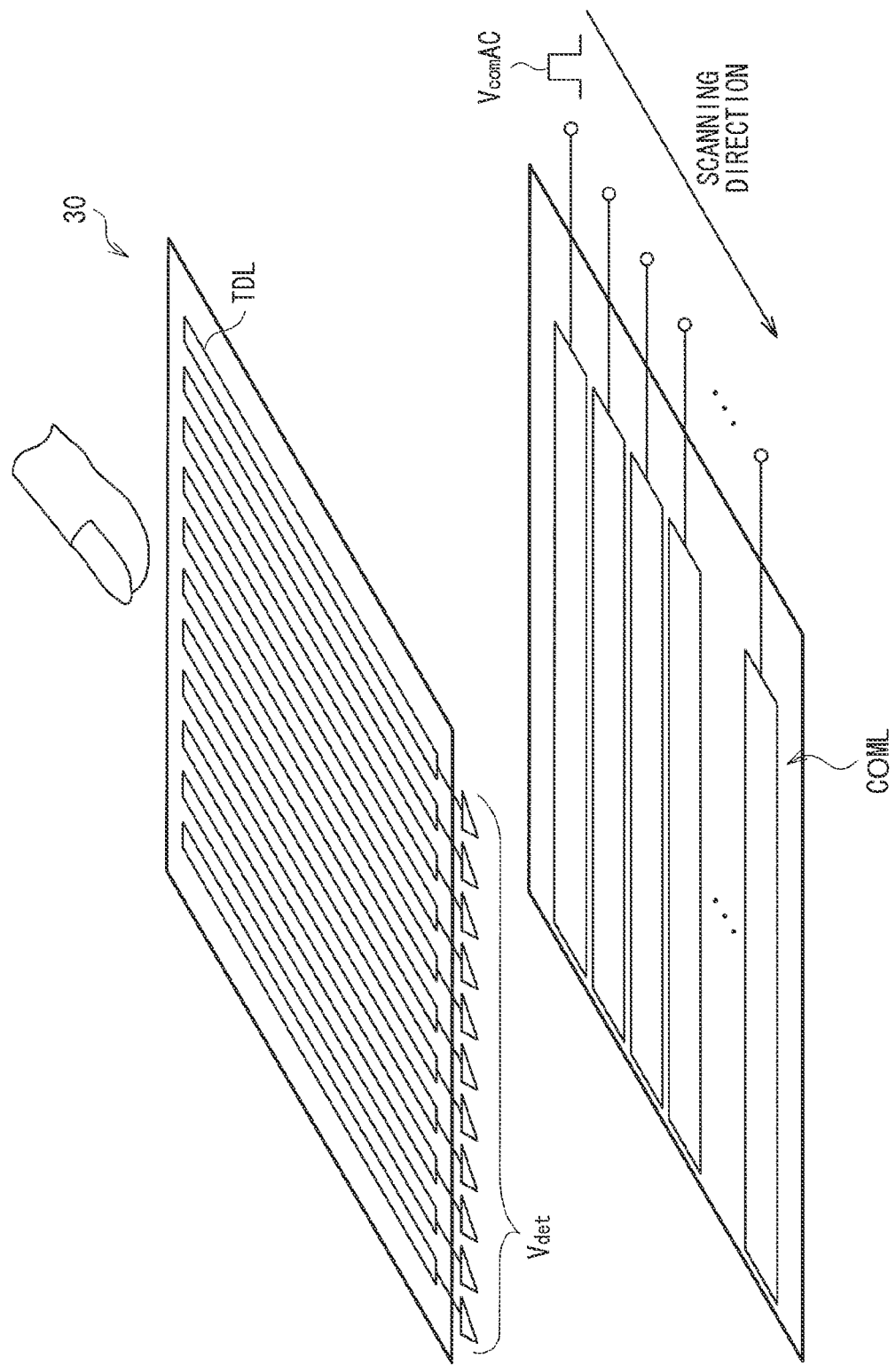
FIG. 8 is a perspective diagram illustrating a configuration example of drive electrodes and a touch detection electrode in the display device with a touch detection function illustrated in FIG. 4.

FIG. 8 illustrates a configuration example of the touch detection device 30 perspectively. The touch detection device 30 is configured to include the drive electrode COML provided at the pixel board 2, and the touch detection electrode TDL provided at the opposite board 3. The drive electrode COML is configured to have a stripe-shaped electrode pattern extending in a lateral direction of this figure. When touch detection operation is performed, the AC drive signal VcomAC is sequentially supplied from the drive electrode driver 16 to each of the electrode patterns, and sequential scanning driving is performed time-divisionally, as will be described later. The touch detection electrode TDL is configured to have stripe-shaped electrode pattern extending in a direction orthogonal to the direction in which the electrode pattern of the drive electrode COML extends. Each of the electrode patterns of the touch detection electrode TDL is connected to an input of the LPF section 42 of the touch detection section 40. The electrode patterns crossing each other by the drive electrode COML and the touch detection electrode TDL form a capacitance at the intersection.

By this configuration, in the touch detection device 30, when the drive electrode driver 16 applies the AC drive signal VcomAC to the drive electrode COML, the touch detection signal Vdet is outputted from the touch detection electrode TDL, and thereby the touch detection is performed. In other words, the drive electrode COML corresponds to the drive electrode E1 in the basic principle of the touch detection illustrated in Part (A) of FIG. 1 to Part (B) of FIG. 3, and the touch detection electrode TDL corresponds to the touch detection electrode E2, and thus, the touch detection device 30 is configured to detect a touch event in accordance with this basic principle. As illustrated in FIG. 8, the electrode patterns intersecting each other form the capacitance touch sensor in a matrix. Therefore, it is also possible to detect a position where a touch or an approach of an external proximity object has occurred, by scanning an entire touch detection surface of the touch detection device 30.

Figure 9A:
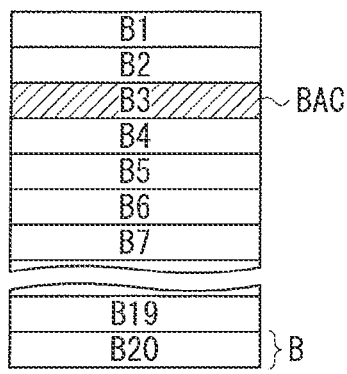
FIGS. 9A to 9C are schematic diagrams illustrating an operation example of touch detection scanning in the display panel with a touch detection function illustrated in FIG. 4.
Figure 9B:
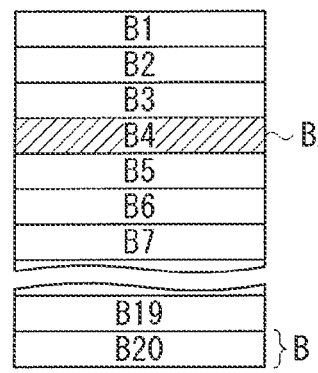
Figure 9C:
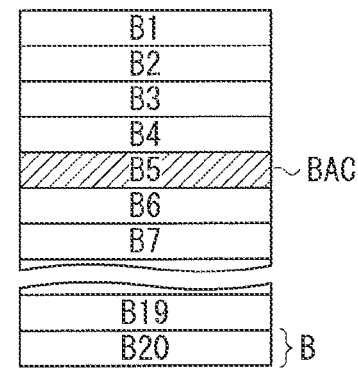

FIGS. 9A to 9C schematically illustrate touch detection scanning. FIGS. 9A to 9C illustrate operation of applying the AC drive signal VcomAC to each of drive electrode blocks B1 to B20, in a case where a display screen/touch detection surface includes the twenty drive electrode blocks B1 to B20. A drive-signal-applied block BAC indicates the drive electrode block B to which the AC drive signal VcomAC is applied, and the DC drive signal VcomDC is applied to other drive electrode blocks B. As illustrated in FIGS. 9A to 9C, the drive electrode driver 16 sequentially selects the drive electrode block B targeted for the touch detection operation, applies the AC drive signal VcomAC thereto, and scans all the drive electrode blocks B. At the time, as will be described later, the drive electrode driver 16 applies the AC drive signal VcomAC to each of the drive electrode blocks B for a predetermined number of horizontal periods. It is to be noted that, in this example, the number of the drive electrode blocks B is twenty for convenience of description, but is not limited to this number.

Figure 10:
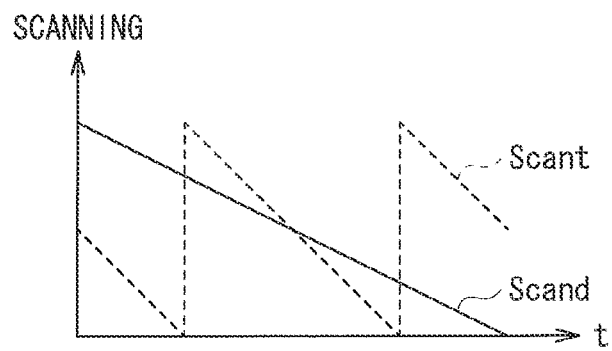
FIG. 10 is a schematic diagram illustrating an operation example of display scanning and the touch detection scanning in the display panel with a touch detection function illustrated in FIG. 4.

FIG. 10 schematically illustrates display scanning and touch detection scanning. In the display panel with a touch detection function 1, the gate driver 12 drives the scanning signal line GCL to perform line-sequential scanning time-divisionally, thereby performing display scanning Scand, and the drive electrode driver 16 sequentially selects and drives the drive electrode block B, thereby performing touch detection scanning Scant. In this example, the touch detection scanning Scant is performed at a scanning speed double the display scanning Scand. In this way, in the display panel with a touch detection function 1, it is possible to instantly respond to a touch by an external proximity object, by allowing the scanning speed of the touch detection to be faster than that of the display scanning, which makes it possible to improve response characteristics for the touch detection. It is to be noted that the touch detection scanning Scant is not limited to this example, and for instance, the touch detection scanning Scant may be performed at a scanning speed double or more than the display scanning Scand, or may be performed at a scanning speed double or less than the display scanning Scand.

Here, the horizontal synchronization signal Hsync corresponds to a specific example of "synchronization signal" in the present disclosure. The control section 11 corresponds to a specific example of "signal generation section" in the present disclosure. The liquid crystal display device 20 corresponds to a specific example of "display section" in the present disclosure. The touch detection device 30 and the touch detection section 40 correspond to a specific example of "touch detection section" in the present disclosure.

The touch detection electrode TDL corresponds to a specific example of "detection electrode" in the present disclosure. The liquid crystal element LC corresponds to a specific example of "display element" in the present disclosure. The AC drive signal VcomAC corresponds to a specific example of "drive signal" in the present disclosure. The touch detection signal Vdet corresponds to a specific example of "detection signal" in the present disclosure.

[Operation and Function]

Next, there will be described the operation and function of the display panel with a touch detection function 1 in the present embodiment.

Summary of Overall Operation

First, a summary of the entire operation of the display panel with a touch detection function 1 will be described with reference to FIG. 4. Based on the image signal Vdisp supplied externally, the control section 11 supplies the control signal to each of the gate driver 12, the source driver 13, the drive electrode driver 16, and the touch detection section 40, thereby controlling these elements to operate in synchronization with one another. The gate driver 12 supplies the scanning signal Vscan to the liquid crystal display device 20, thereby sequentially selecting one horizontal line targeted for display driving. The source driver 13 generates the pixel signal Vsig, into which the pixel signals Vpix are multiplexed, and the switch control signal Vsel corresponding thereto, and supplies the generated signals to the selector switch section 14. The selector switch section 14 demultiplexes and generates the pixel signal Vpix based on the pixel signal Vsig and the switch control signal Vsel, and supplies the pixel signal Vpix to each of the pixels Pix included in one horizontal line. The drive electrode driver 16 sequentially applies the AC drive signal VcomAC to the drive electrode block B, and also applies the DC drive signal VcomDC to the drive electrode COML to which the AC drive signal VcomAC is not applied. The display device with a touch detection function 10 performs the display operation as well as the touch detection operation, and outputs the touch detection signal Vdet from the touch detection electrode TDL. The LPF section 42 removes the high frequency component (noise component) included in the touch detection signal Vdet, and extracts and outputs the touch component. The A/D conversion section 43 converts the analog signal outputted from the LPF section 42 into the digital signal. The signal processing section 44 detects the presence or absence of a touch on the display device with a touch detection function 10, based on the output signal of the A/D conversion section 43. The signal processing section 44 also detects the presence or absence of a disturbance noise, and according to a result of the detection, orders the control section 11 to change the pulse period of the pulse P included in the horizontal synchronization signal Hsync, through the period control signal CTL. When the touch detection is performed in the signal processing section 44, the coordinate extraction section 45 determines its touch-panel coordinates. The detection-timing control section 46 controls the LPF section 42, the A/D conversion section 43, the signal processing section 44, and the coordinate extraction section 45 to operate in synchronization with one another.

Detailed Operation

Next, detailed operation of the display panel with a touch detection function 1 will be described.

Figure 11:
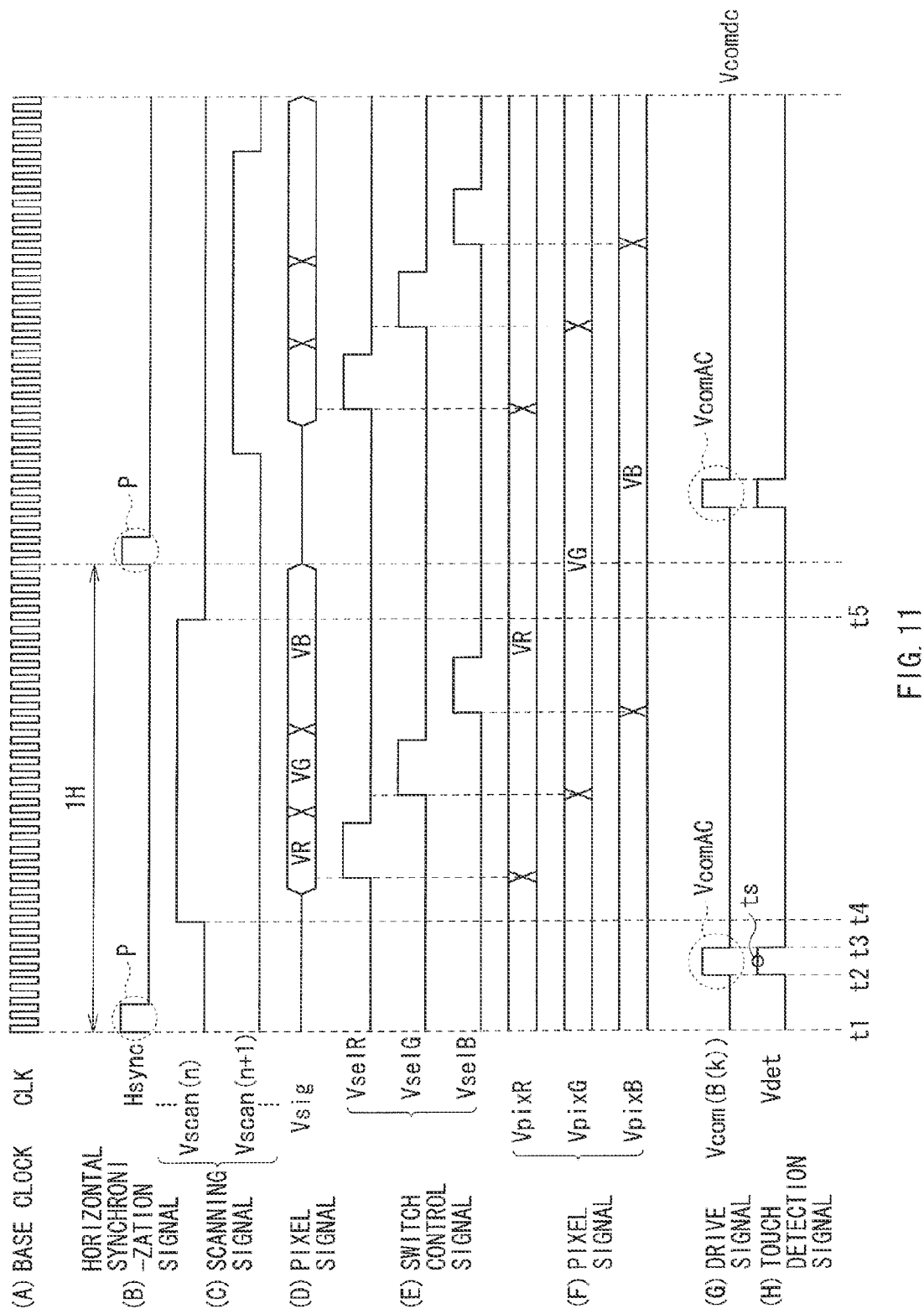
FIG. 11 illustrates timing waveform charts illustrating an operation example of the display panel with a touch detection function illustrated in FIG. 4.

Parts (A) to (H) of FIG. 11 illustrate timing waveform examples of the display panel with a touch detection function 1, namely, Part (A) indicates a waveform of the base clock CLK, Part (B) indicates a waveform of the horizontal synchronization signal Hsync, Part (C) indicates waveforms of the scanning signal Vscan, Part (D) indicates a waveform of the pixel signal Vsig, Part (E) indicates waveforms of the switch control signal Vsel, Part (F) indicates waveforms of the pixel signal Vpix, Part (G) indicates a waveform of the drive signal Vcom, and Part (H) indicates a waveform of the touch detection signal Vdet.

In the display panel with a touch detection function 1, the touch detection operation and the display operation are carried out in each one horizontal period (1H). In the display operation, the gate driver 12 sequentially applies the scanning signal Vscan to the scanning signal line GCL, thereby performing the display operation. In the touch detection operation, the drive electrode driver 16 sequentially applies the AC drive signal VcomAC to each of the drive electrode blocks B, thereby performing the touch detection scanning, and the touch detection section 40 detects the touch event based on the touch detection signal Vdet outputted from the touch detection electrode TDL. Operation timing of each of them is set based on the base clock CLK. The details will be described below.

First, the control section 11 generates the pulse P as the horizontal synchronization signal Hsync at timing t1, and supplies the pulse P to the gate driver 12 (Part (B) of FIG. 11). As a result, one horizontal period begins.

Next, the drive electrode driver 16 applies the AC drive signal VcomAC to the drive electrode COML in a period of timing t2 to t3, and the touch detection section 40 samples the touch detection signal Vdet at sampling timing ts. Specifically, the drive electrode driver 16 applies the AC drive signal VcomAC formed like a pulse to the drive electrode COML that is included in the kth drive electrode block B(k) related to the touch detection operation, in the period of timing t2 to t3 synchronized with the horizontal synchronization signal Hsync (Part (G) of FIG. 11). This AC drive signal VcomAC is transmitted to the touch detection electrode TDL through the capacitance, and thereby the touch detection signal Vdet changes (Part (H) of FIG. 11). Then, at the sampling timing ts, the A/D conversion section 43 of the touch detection section 40 performs A/D conversion on the output signal of the LPF section 42 to which this touch detection signal Vdet has been inputted (Part (H) of FIG. 11). The signal processing section 44 of the touch detection section 40 performs the touch detection, based on a result of this A/D conversion collected over a plurality of horizontal periods, as will be described later.

Next, at timing t4, the gate driver 12 applies the scanning signal Vscan to the scanning signal line GCL(n) in the nth row related to the display operation, and the scanning signal Vscan(n) changes from a low level to a high level (Part (C) of FIG. 11). Then, the source driver 13 and the selector switch section 14 apply the pixel signal Vpix to the pixel signal line SGL (Part (F) of FIG. 11), and the display of the pixels Pix of the one horizontal line related to the scanning signal line GCL(n) in the nth row is performed.

Specifically, at first, the gate driver 12 changes the scanning signal Vscan(n) from the low level to the high level at the timing t4, thereby selecting the one horizontal line related to the display operation. Then, the source driver 13 supplies a pixel voltage VR for the red subpixel SPix to the selector switch section 14, as the pixel signal Vsig (Part (D) of FIG. 11), and also generates the switch control signal VselR that is at a high level in a period during which the pixel voltage VR is supplied, and supplies the generated signal to the selector switch section 14 (Part (E) of FIG. 11). Subsequently, the selector switch section 14 makes the switch SWR enter an ON state in the period during which this switch control signal VselR is at the high level, thereby demultiplexing the pixel voltage VR supplied from the source driver 13 from the pixel signal Vsig, and supplies the pixel voltage VR as the pixel signal VpixR to the red subpixel SPix related to the one horizontal line, via the pixel signal line SGL (Part (F) of FIG. 11). It is to be noted that after the switch SWR enters an OFF state, this pixel signal line SGL enters a floating state and thus, the voltage of this pixel signal line SGL is maintained (Part (F) of FIG. 11). Similarly, the source driver 13 supplies a pixel voltage VG for the green subpixel SPix together the corresponding switch control signal VselG to the selector switch section 14 (Parts (D) and (E) of FIG. 11), and the selector switch section 14 demultiplexes this pixel voltage VG from the pixel signal Vsig based on the switch control signal VselG, and supplies the pixel voltage VG as the pixel signal VpixG to the green subpixel SPix related to the one horizontal line, via the pixel signal line SGL (Part (F) of FIG. 11). Afterwards, similarly, the source driver 13 supplies a pixel voltage VB for the blue subpixel SPix together the corresponding switch control signal VselB to the selector switch section 14 (Parts (D) and (E) of FIG. 11), and the selector switch section 14 demultiplexes this pixel voltage VB from the pixel signal Vsig based on the switch control signal VselB, and supplies the pixel voltage VB as the pixel signal VpixB to the blue subpixel SPix related to the one horizontal line, via the pixel signal line SGL (Part (F) of FIG. 11).

Next, at timing t5, the gate driver 12 changes the scanning signal Vscan(n) of the scanning signal line GCL in the nth row from the high level to the low level (Part (C) of FIG. 11). This electrically isolates the subpixel SPix of the one horizontal line related to the display operation, from the pixel signal line SGL.

Afterwards, in the display panel with a touch detection function 1, by repeating the operation described above, the display operation in the entire display screen is performed by the line-sequential scanning, and also the touch detection operation in the entire touch detection surface is performed by performing the scanning of the drive electrode blocks B one by one as will be described below.

Figure 12:
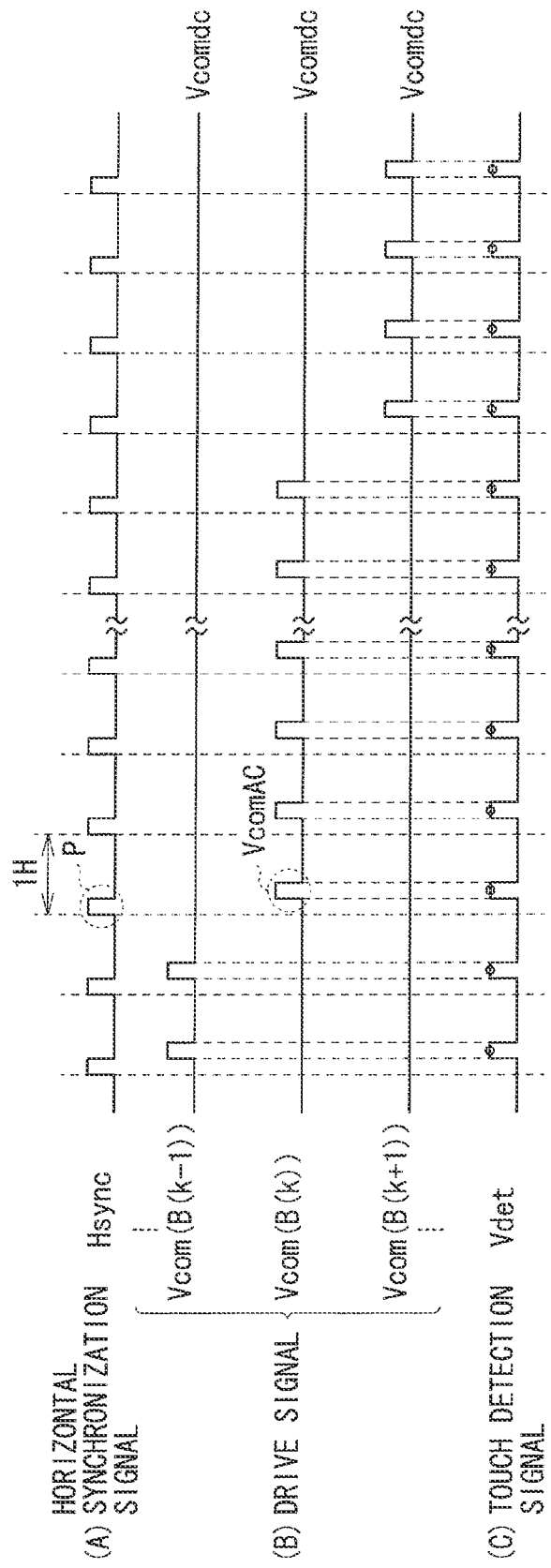
FIG. 12 illustrates timing waveform charts illustrating an example of touch detection operation in the display panel with a touch detection function illustrated in FIG. 4.

Parts (A) to (C) of FIG. 12 illustrate an operation example of the touch detection scanning, namely, Part (A) indicates a waveform of the horizontal synchronization signal Hsync, Part (B) indicates waveforms of the drive signal Vcom, and Part (C) indicates a waveform of the touch detection signal Vdet.

As illustrated in Parts (A) to (C) of FIG. 12, the drive electrode driver 16 generates the AC drive signal VcomAC synchronized with the horizontal synchronization signal Hsync, and sequentially subjects the drive electrode COML to the touch detection scanning for each of the drive electrode blocks B. At the time, the drive electrode driver 16 applies the AC drive signal VcomAC to each of the drive electrode blocks B over a predetermined number of horizontal periods (Part (B) of FIG. 12). Specifically, for example, in a case where the drive electrode block B includes forty drive electrodes COML, the drive electrode driver 16 applies the AC drive signal VcomAC over twenty consecutive horizontal periods. The touch detection section 40 samples the touch detection signal Vdet based on this AC drive signal VcomAC in each one of the horizontal periods (Part (C) of FIG. 12), and after the sampling in the last one of these predetermined number of horizontal periods is finished, the signal processing section 44 detects the presence or absence of the touch event in the region corresponding to the drive electrode block B based on a plurality of (twenty, in this example) the sampling results. In this way, the touch detection is performed based on the plurality of sampling results and thus, it is possible to analyze the sampling results statistically, suppress deterioration of the S/N ratio caused by variation of the sampling results, and enhance accuracy of the touch detection.

In this example, the drive electrode block B includes the forty drive electrodes COML, and the drive electrode driver 16 applies the AC drive signal VcomAC over the twenty horizontal periods. This makes the scanning speed of this touch detection scanning double the scanning speed of the display scanning in which the line-sequential scanning is performed. It is to be noted that, the period of applying the AC drive signal VcomAC is not limited to the twenty horizontal periods, and instead, may be forty horizontal periods, or ten horizontal periods. When the period of applying the AC drive signal VcomAC is set to be the forty horizontal periods, the scanning speed of the touch detection scanning is equal to the scanning speed of the display scanning, and when the period of applying the AC drive signal VcomAC is set to be the ten horizontal periods, the scanning speed of the touch detection scanning is four times the scanning speed of the display scanning. Further, the number of the drive electrodes COML included in the drive electrode block B is not limited to 40, and may be 39 or less, or 41 or more.

Figure 13:
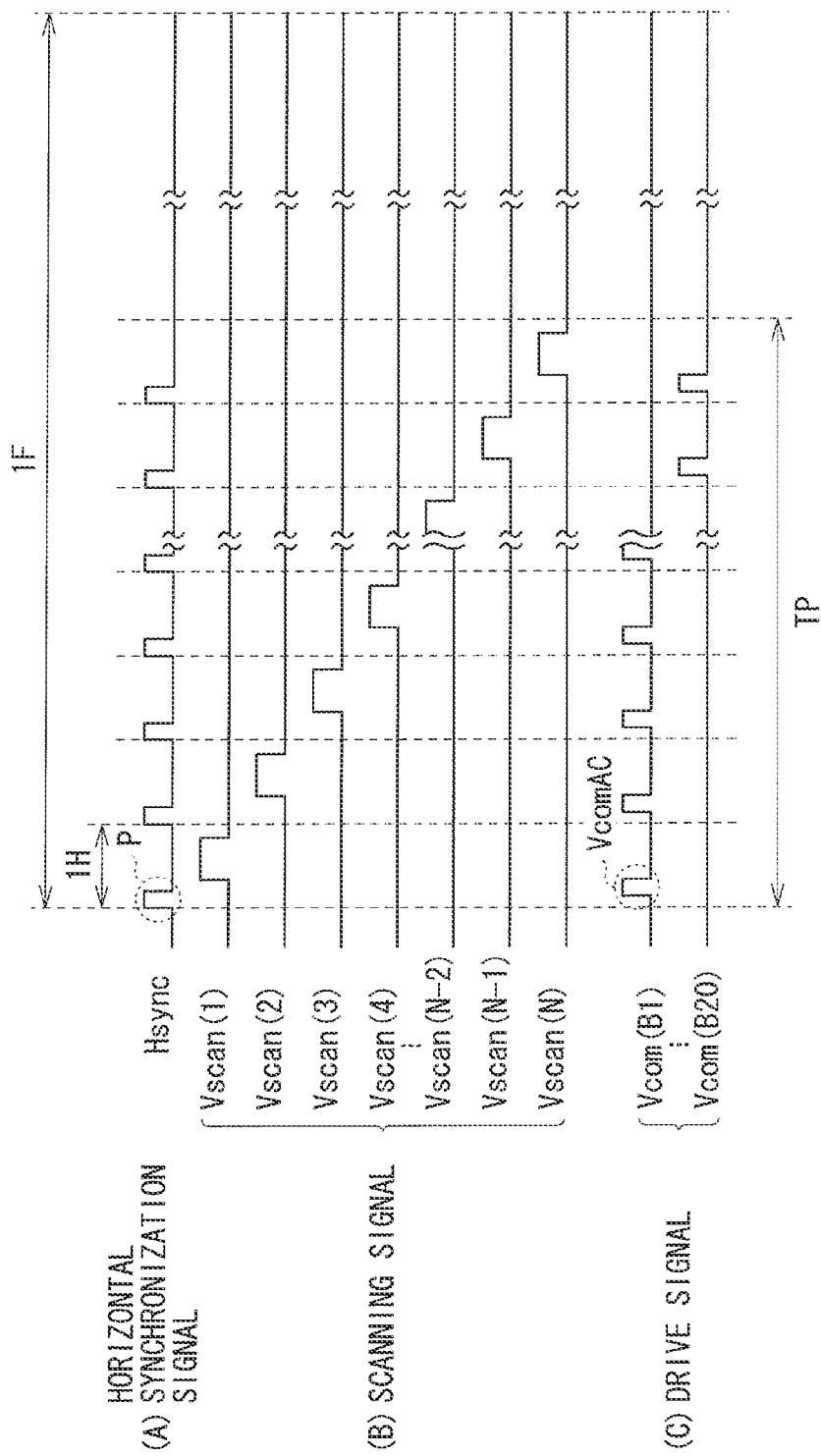
FIG. 13 illustrates timing waveform charts illustrating an operation example of the display scanning and the touch detection scanning in the display panel with a touch detection function illustrated in FIG. 4.

Parts (A) to (C) of FIG. 13 illustrate the display scanning and the touch detection scanning in one frame period, namely, where Part (A) indicates a waveform of the horizontal synchronization signal Hsync, Part (B) indicates waveforms of the scanning signal Vscan, and Part (C) indicates waveforms of the drive signal Vcom. It is to be noted that, in this example, the total number of the scanning signal lines GCL for the entire display screen is N.

As illustrated in Parts (A) to (C) of FIG. 13, the control section 11 generates the pulses P whose quantity is N and which are each arranged at a predetermined pulse period (one horizontal period), and supplies the generated pulses P to the gate driver 12 as the horizontal synchronization signal Hsync (Part (A) of FIG. 13). Then, the gate driver 12 sequentially generates the scanning signals Vscan(1) to Vscan(N) in synchronization with the respective pulses of this horizontal synchronization signal Hsync, and supplies the generated signals to the scanning signal lines GCL(1) to GCL(N), respectively, whose quantity is N. Thus, in the display panel with a touch detection function 1, the display for the entire display screen is performed in a period (a pulse duration TP) corresponding to the pulses P whose quantity is N, which is shorter than the one frame period.

Meanwhile, the drive electrode driver 16 generates the AC drive signal VcomAC synchronized with the horizontal synchronization signal Hsync in this pulse duration TP, and sequentially supplies the generated signal to the drive electrode blocks B1 to B20, and the touch detection section 40 detects the presence or absence of the touch event based on the touch detection signal Vdet corresponding to the AC drive signal VcomAC. Thus, in the display panel with a touch detection function 1, the touch detection for the entire touch detection surface is performed in this pulse duration TP. It is to be noted that, in this example, as described above, the scanning speed of the touch detection scanning is double the scanning speed of the display scanning and therefore, the touch detection for the entire touch detection surface is performed twice in this pulse duration TP.

[Operation at Application of Disturbance Noise]

Next, operation when a disturbance noise is applied will be described. The disturbance noise often affects touch detection. For example, when a disturbance noise having a component that is an integral multiple of a sampling frequency fs of the touch detection (i.e., the inverse of the time of one horizontal period) is transmitted to a touch panel, the S/N ratio of a touch component may deteriorate, and accuracy of the touch detection may decrease.

Therefore, the display panel with a touch detection function 1 changes a sampling frequency fs of the touch detection, when a disturbance noise of a component that is an integral multiple of the sampling frequency fs is applied, and the disturbance noise is detected by the touch detection section 40. This allows the disturbance noise not to include the component of the integral multiple of the changed sampling frequency fs and thus, the S/N ratio of the touch component is improved, and the accuracy of the touch detection is enhanced.

In the display panel with a touch detection function 1, when the disturbance noise is detected, the signal processing section 44 of the touch detection section 40 orders the control section 11 to change the pulse period of the pulse P in the horizontal synchronization signal Hsync, through the period control signal CTL. Then, the control section 11 generates the horizontal synchronization signal Hsync with the changed pulse period of the pulse P, and supplies the generated signal to the gate driver 12. Further, the control section 11 controls the drive electrode driver 16 through the drive-electrode-driver control signal, to apply the AC drive signal VcomAC to the drive electrode COML at timing synchronized with the horizontal synchronization signal Hsync. Then, the control section 11 controls the touch detection section 40 through the touch-detection control signal, to sample the touch detection signal Vdet at timing synchronized with the AC drive signal VcomAC. In this way, in the display panel with a touch detection function 1, the sampling frequency fs changes depending on the presence or absence of the disturbance noise.

Figure 14:
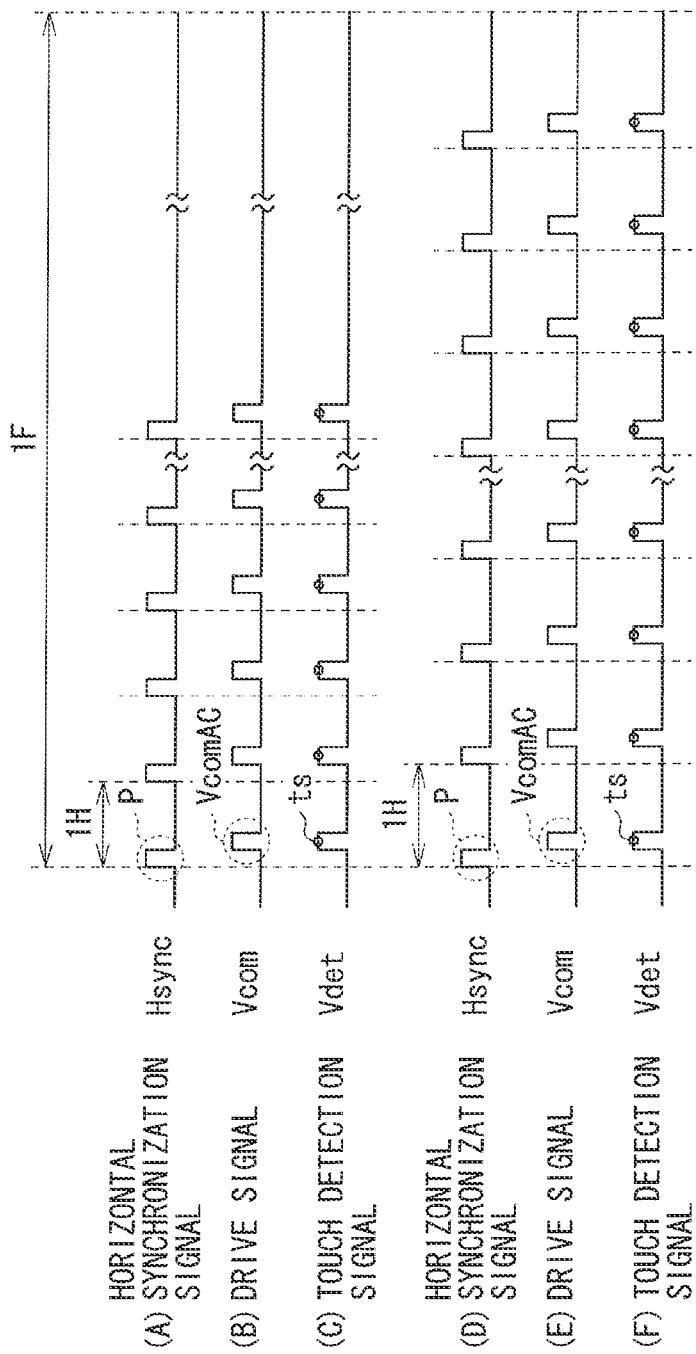
FIG. 14 illustrates timing waveform charts for explaining a change in a sampling frequency related to the touch detection operation in the display panel with a touch detection function illustrated in FIG. 4.

Parts (A) to (F) of FIG. 14 illustrate an example of the touch detection operation in each of a case where there is no disturbance noise and a case where there is a disturbance noise, namely, Parts (A) to (C) indicate an operation example in the case where there is no disturbance noise, and Parts (D) to (F) indicate an operation example in the case where the disturbance noise is present. In FIG. 14, Parts (A) and (D) each indicate a waveform of the horizontal synchronization signal Hsync, Parts (B) and (E) each indicate a waveform of the drive signal Vcom, and Parts (C) and (F) each indicate a waveform of the touch detection signal Vdet.

As illustrated in Parts (A) to (F) of FIG. 14, in the display panel with a touch detection function 1, the pulse period of the pulse P in the horizontal synchronization signal Hsync changes depending on the presence or absence of the disturbance noise. In this example, the control section 11 makes the pulse period of the pulse P short in the case where there is no disturbance noise (Part (A) of FIG. 14), compared to the case where the disturbance noise is present (Part (D) of FIG. 14). With this, the pulse period of the AC drive signal VcomAC also changes depending on the presence or absence of the disturbance noise (Parts (B) and (E) of FIG. 14), and the sampling frequency fs of the touch detection changes as well (Parts (C) and (F) of FIG. 14).

In this way, the sampling frequency fs of the touch detection is made to change when the disturbance noise having the component of the integral multiple of the sampling frequency fs is applied and the disturbance noise is detected by the touch detection section 40, and therefore, it is possible to improve the accuracy of the touch detection.

Further, as illustrated in Parts (A) to (F) of FIG. 14, a frame period (1F) is constant regardless of the presence or absence of the disturbance noise. In other words, the display panel with a touch detection function 1 performs display based on the supplied image signal Vdisp, and performs display for one screen in the frame period determined by this image signal Vdisp. This eliminates conversion of a frame rate, for example, thereby making it possible to simplify a circuit configuration.

As illustrated in Parts (A) to (F) of FIG. 14, in the display panel with a touch detection function 1, the pulse period of the pulse P in the horizontal synchronization signal Hsync changes depending on the presence or absence of the disturbance noise. In other words, a period (one horizontal period) of display changes depending on the presence or absence of the disturbance noise. The display operation in this case will be described below.

Figure 15:
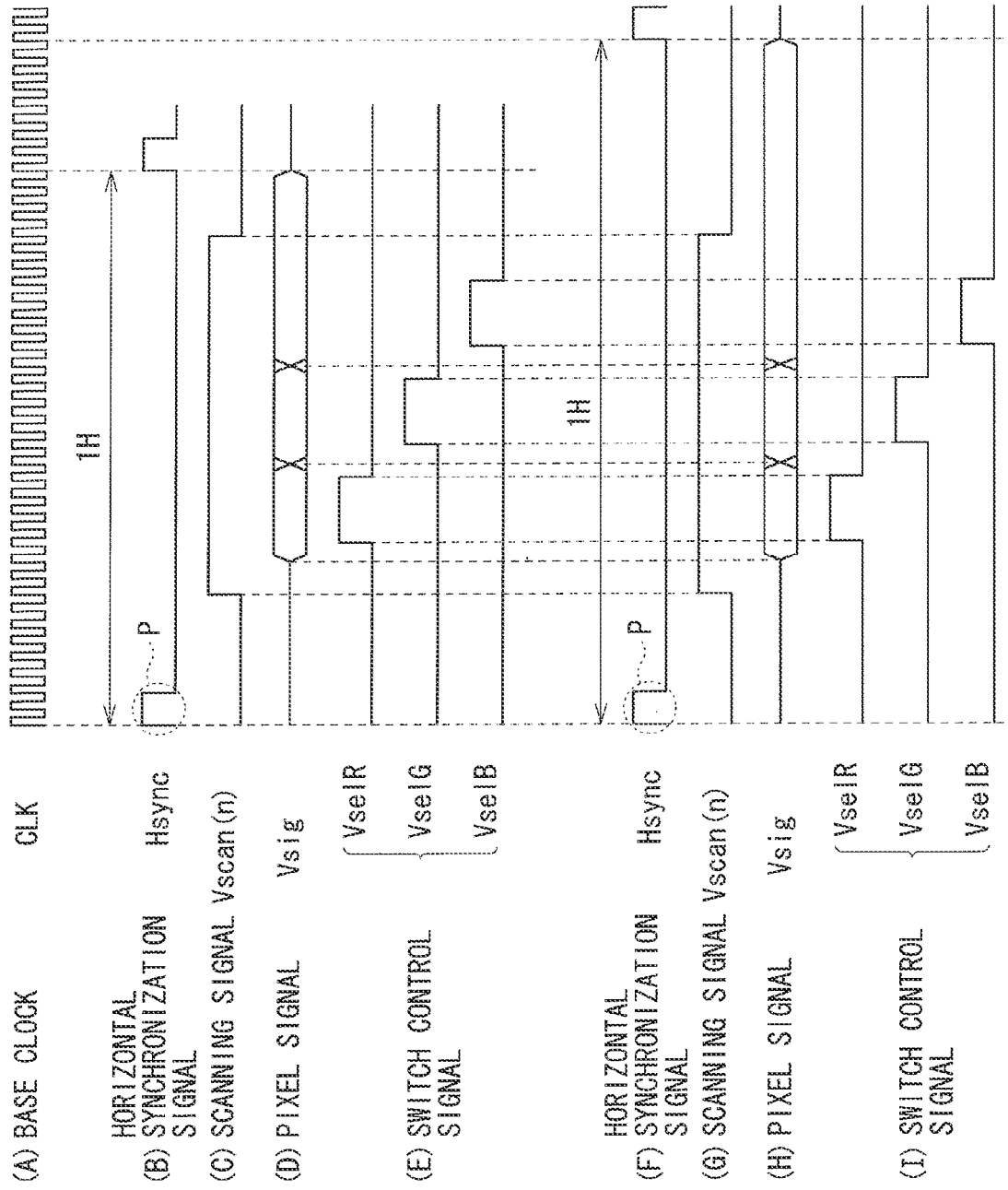
FIG. 15 illustrates timing waveform charts for explaining an example of display operation in the display panel with a touch detection function illustrated in FIG. 4.

Parts (A) to (I) of FIG. 15 illustrate an example of the display operation in each of a case where there is no disturbance noise and a case where there is a disturbance noise, namely, Part (A) indicates a waveform of the base clock CLK, Parts (B) to (E) indicate an operation example in the case where there is no disturbance noise, and Parts (F) to (I) indicate an operation example in the case where the disturbance noise is present. In FIG. 15, Parts (B) and (F) each indicate the horizontal synchronization signal Hsync, Parts (C) and (G) each indicate the scanning signal Vscan, Parts (D) and (H) each indicate the pixel signal Vsig, and Parts (E) and (I) each indicate the switch control signal Vsel. It is to be noted that the frequency of the base clock CLK is constant regardless of the presence or absence of the disturbance noise.

As illustrated in Parts (A) to (I) of FIG. 15, timing of each of the scanning signal Vscan, the pixel signal Vsig, and the switch control signal Vsel is constant regardless of the presence or absence of the disturbance noise. In other words, the presence or absence of the disturbance noise does not change timing of writing the pixel signal for one horizontal line, but changes only the pulse period of the pulse P in the horizontal synchronization signal Hsync. In this way, since the timing of writing the pixel signal for one horizontal line is made constant, a possibility of a change in a displayed image due to the presence or absence of the disturbance noise may be reduced, and degradation in image quality may be suppressed.

Effects

As described above, in the present embodiment, the length of the horizontal period may be changed when the disturbance noise is applied and thus, it is possible to improve the S/N ratio and enhance the accuracy of the touch detection.

Further, in the present embodiment, the frame period is kept constant when the length of the horizontal period is changed and thus, it is possible to simplify the circuit configuration.

Furthermore, in the present embodiment, only the pulse period of the pulse of the horizontal synchronization signal is changed when the length of the horizontal period is changed and thus, it is possible to suppress degradation in image quality.

Modification 1-1

In the above-described embodiment, as illustrated in Parts (A) to (F) of FIG. 14, the pulse period of the pulse P is made short in the case where there is no disturbance noise, compared to the case where the disturbance noise is present, but this is not a limitation. Instead, for example, the pulse period of the pulse P may be made long in the case where there is no disturbance noise, compared to the case where the disturbance noise is present.

Modification 1-2

In the above-described embodiment, the AC drive signal VcomAC synchronized with the horizontal synchronization signal Hsync is generated in the pulse duration TP, but this is not a limitation. Instead, as illustrated in Parts (A) to (C) of FIG. 16, the AC drive signal VcomAC may be generated also in a period other than the pulse duration TP. In this example, the display for the entire display screen is carried out in the pulse duration TP, and on the other hand, the touch detection for the entire touch detection surface is performed in one frame period including this pulse duration TP. In this touch detection operation, it is possible to apply the AC drive signal VcomAC to each of the drive electrode blocks B over the number of the horizontal periods greater than that in the case in Parts (A) to (C) of FIG. 13. This makes it possible to further suppress the deterioration of the S/N ratio caused by the variation of the sampling results, and further enhance the accuracy of the touch detection.

Figure 16:
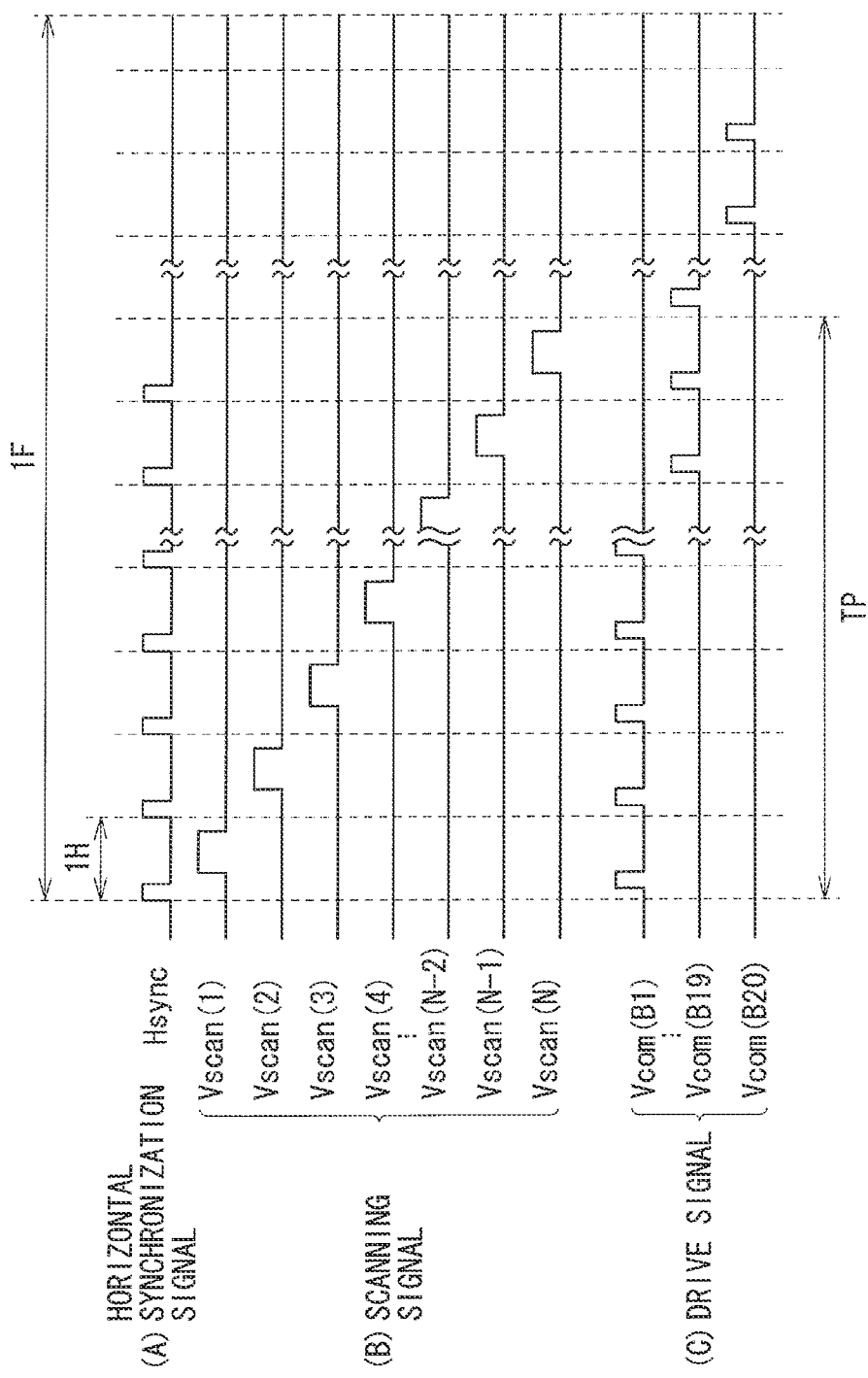
FIG. 16 illustrates timing waveform charts illustrating an operation example of display scanning and touch detection scanning in a display panel with a touch detection function according to a modification of the embodiment.

Further, for example, the pulse period of the pulse P may be made short and operation like the present modification (Parts (A) to (C) of FIG. 16) may be performed when there is no disturbance noise, and the pulse period of the pulse P may be made long and operation like the above-described embodiment (Parts (A) to (C) of FIG. 13) may be performed when the disturbance noise is present. In other words, it is possible to improve the accuracy of the touch detection by applying the AC drive signal VcomAC to each of the drive electrode blocks B over a greater number of horizontal periods when there is no disturbance noise, and it is possible to prevent deterioration of the S/N ratio due to the disturbance noise by making the pulse period of the pulse P long when the disturbance noise is present.

Specifically, in the present modification, when the pulse duration TP is shorter than a predetermined length in one frame period, the touch detection operation is performed by effectively utilizing a blanking period except the pulse duration TP, in the one frame period. Here, for example, the predetermined length may be the length of the pulse duration corresponding to the length of the blanking period in which it is possible to perform the touch detection operation sufficiently.

Modification 1-3

In the above-described embodiment, the length of the horizontal period is changed by altering the pulse period of the pulse P of the horizontal synchronization signal Hsync, while the clock frequency of the base clock CLK is kept constant, but this is not a limitation. Instead, for example, the length of the horizontal period may be changed by altering the clock frequency of the base clock CLK. The details will be described below.

Figure 17:
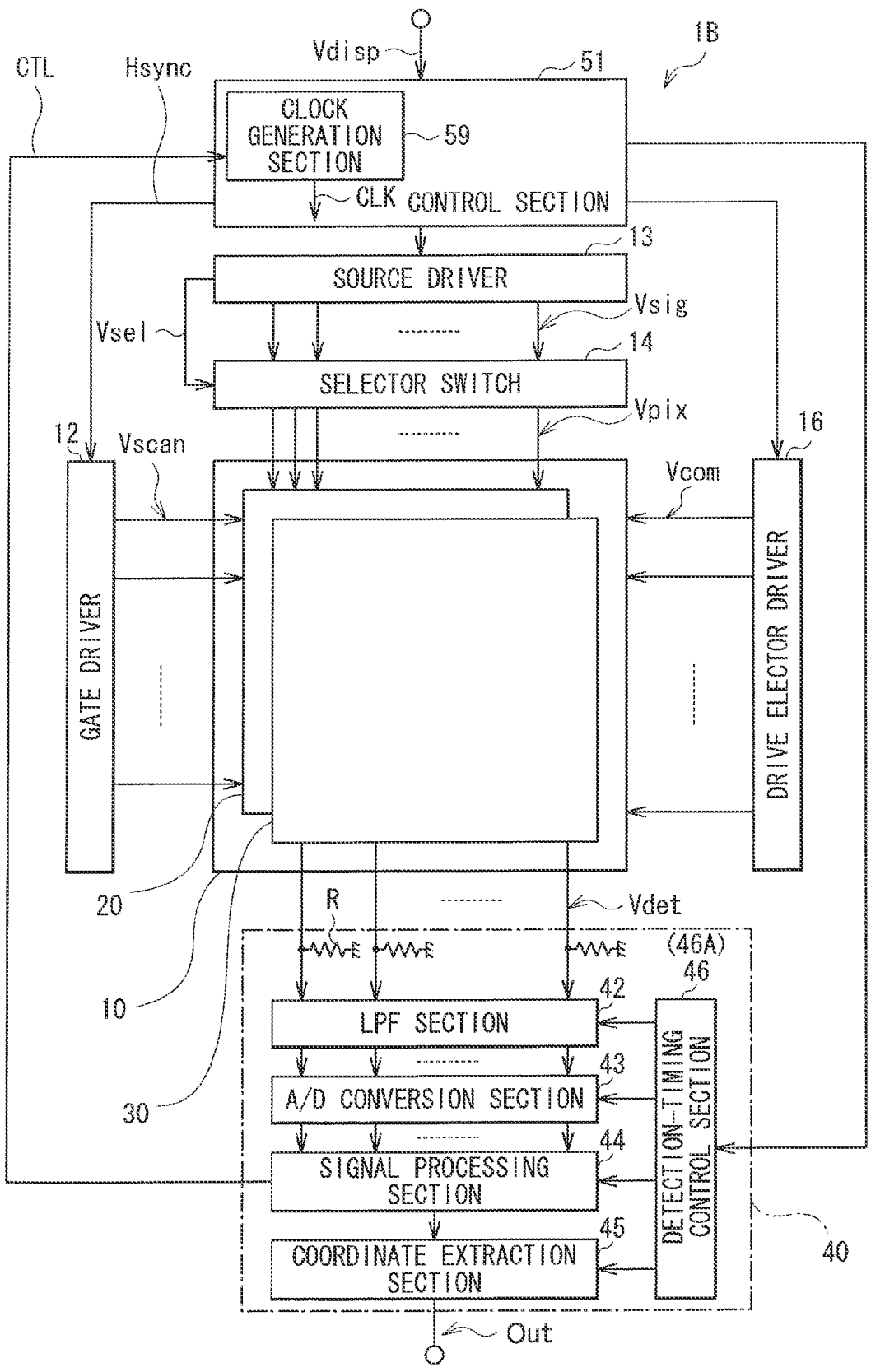
FIG. 17 is a block diagram illustrating a configuration example of a display panel with a touch detection function according to another modification of the embodiment.

FIG. 17 illustrates a configuration example of a display panel with a touch detection function 1B. The display panel with a touch detection function 1B includes a control section 51. The control section 51 has a clock generation section 59 in which the frequency of a base clock CLK generated thereby may be changed. This frequency of the base clock CLK is changed based on a period control signal CTL supplied from a touch detection section 40.

In the display panel with a touch detection function 1B, when a disturbance noise is detected, a signal processing section 44 of the touch detection section 40 orders, through the period control signal CTL, the control section 51 to change the frequency of the base clock CLK. Then, based on the base clock CLK whose frequency has been changed, the control section 51 generates and supplies a horizontal synchronization signal Hsync to a gate driver 12, generates and supplies a drive-electrode-driver control signal to a drive electrode driver 16, and generates and supplies a touch-detection control signal to a touch detection section 40. Thus, like the above-described embodiment (Parts (A) to (F) of FIG. 14), it is possible to improve accuracy of touch detection because a sampling frequency fs varies. In other words, in the display panel with a touch detection function 1B, the length of the horizontal period is changed indirectly by changing the frequency of the base clock CLK, and thereby the sampling frequency fs is changed.

Figure 18:
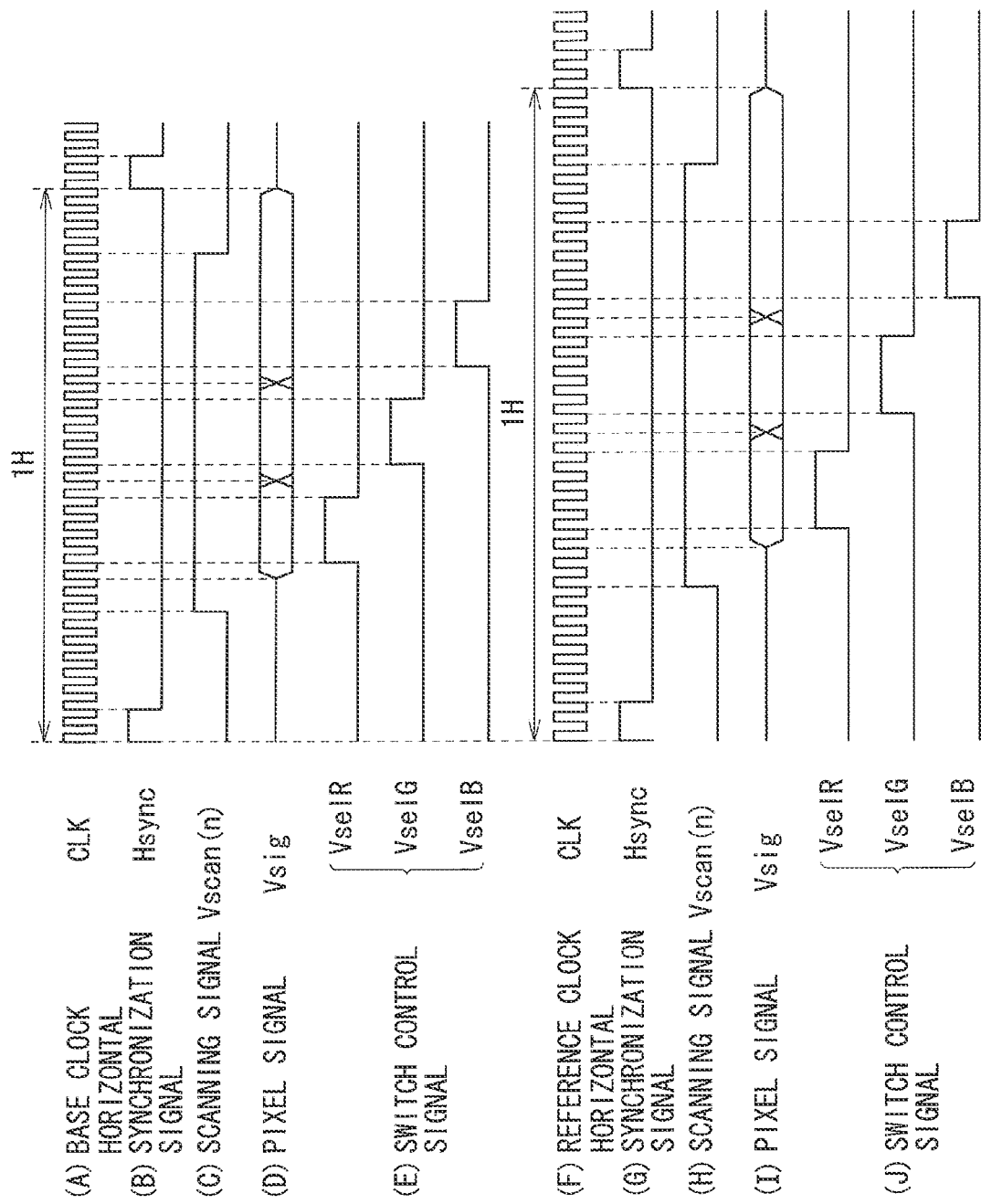
FIG. 18 illustrates timing waveform charts for explaining an example of display operation in the display panel with a touch detection function according to this modification of the embodiment.

Parts (A) to (J) of FIG. 18 illustrate an example of display operation in each of a case where there is no disturbance noise and a case where there is a disturbance noise, namely, Parts (A) to (E) indicate an operation example in the case where there is no disturbance noise, and Parts (F) to (J) indicate an operation example in the case where the disturbance noise is present. In FIG. 18, Parts (A) and (F) each indicate a waveform of the base clock CLK, Parts (B) and (G) each indicate the horizontal synchronization signal Hsync, Parts (C) and (H) each indicate a scanning signal Vscan, Parts (D) and (I) each indicate a pixel signal Vsig, and Parts (E) and (J) each indicate a switch control signal Vsel. As illustrated in Parts (A) to (J) of FIG. 18, timing of each of the horizontal synchronization signal Hsync, the scanning signal Vscan, the pixel signal Vsig, and the switch control signal Vsel varies according to the frequency of the base clock CLK. In other words, a timing of writing a pixel signal for one horizontal line changes depending on the presence or absence of the disturbance noise. In this way, in a case where an influence on a displayed image may be tolerated even when the timing of writing the pixel signal varies, it is possible to apply this modification.

Modification 1-4

In the above-described embodiment, driving and scanning of the drive electrodes COML is performed for each of the drive electrode blocks B each including the predetermined number of the drive electrodes COML, but this is not a limitation. Instead, for example, a predetermined number of the drive electrodes COML may be driven simultaneously, and scanned by shifting through the driven drive electrodes COML one by one. The details will be described below.

Figure 19A:
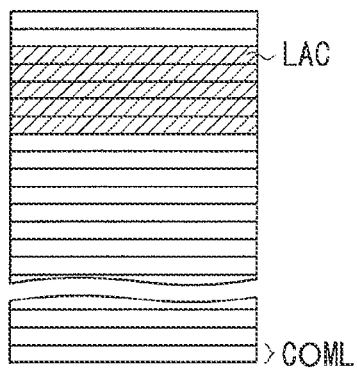
FIGS. 19A to 19C are schematic diagrams illustrating an operation example of touch detection scanning in a display panel with a touch detection function according to still another modification of the embodiment.
Figure 19B:
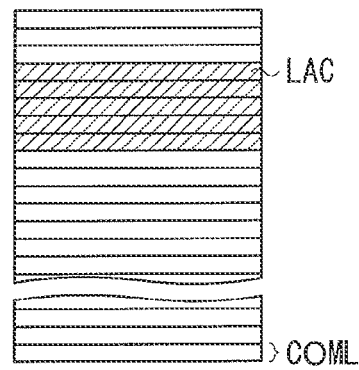
Figure 19C:
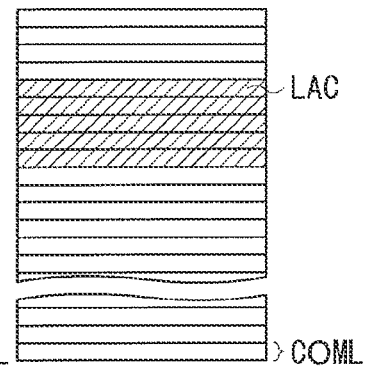

FIGS. 19A to 19B schematically illustrate an operation example of a drive electrode driver 16C according to the present modification. The drive electrode driver 16C applies an AC drive signal VcomAC to the predetermined number of drive electrodes COML simultaneously. Specifically, the drive electrode driver 16C applies the AC drive signal VcomAC to the predetermined number (five, in this case) of the drive electrodes COML simultaneously (a drive-signal-applied electrode LAC). Then, the drive electrode driver 16C performs touch detection scanning by shifting through one by one the drive electrodes COML to which the AC drive signal VcomAC is applied. It is to be noted that, in this example, the AC drive signal VcomAC is applied to the five drive electrodes COML simultaneously, but is not limited to this example, and the AC drive signal VcomAC may be applied to four or less, or six or more drive electrodes COML simultaneously. Further, in this example, the scanning is performed by shifting through one by one the drive electrodes COML to which the AC drive signal VcomAC is applied, but this is not a limitation, and shifting for every two or more may be performed.

Other Modifications

In the above-described embodiment, there is provided a configuration in which the length of the pulse period of the pulse P is allowed to be set in two stages, but this is not a limitation, and there may be provided a configuration in which the length of the pulse period of the pulse P is allowed to be set, for example, in three or more stages.

In the above-described embodiment, the drive electrode block B is configured to include the plurality of drive electrodes COML, but is not limited to this example. Instead, for example, the plurality of drive electrodes may be formed to be thick by being integrated, and this may be driven as the drive electrode block B.

3. Application Examples

Next, with reference to FIG. 20 to FIG. 24G, there will be described application examples of the display panel with a touch detection function in each of the above-described embodiment and modifications. The display panel with a touch detection function in each of the embodiment and the like may be applied to electronic units in various fields, such as television receivers, digital cameras, laptop computers, portable terminal devices such as portable telephones, and video cameras. In other words, it is possible to apply the display panel with a touch detection function in each of the embodiment and the like to electronic units in various fields, which display externally-input image signals or internally-generated image signals as still or moving images.

Application Example 1

Figure 20:
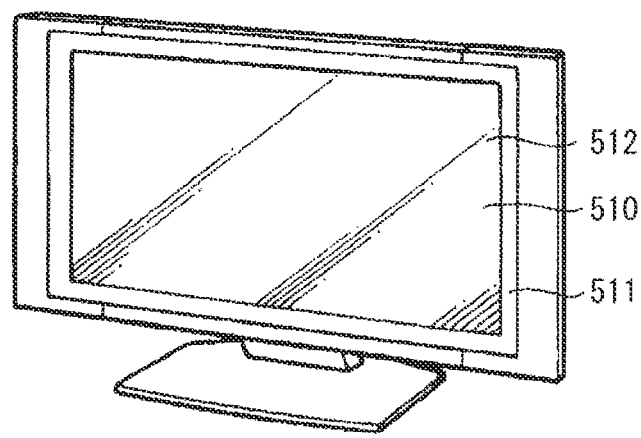
FIG. 20 is a perspective view illustrating a configuration of an appearance of an application example 1, among display panels each provided with a touch detection function, to which the embodiment is applied.

FIG. 20 illustrates an external view of a television receiver to which the display panel with a touch detection function in any of the embodiment and the like is applied. This television receiver has, for example, a video display screen section 510 that includes a front panel 511 and a filter glass 512, and this video display screen section 510 is configured using the display panel with a touch detection function according to any of the embodiment and the like.

Application Example 2

Figure 21A:
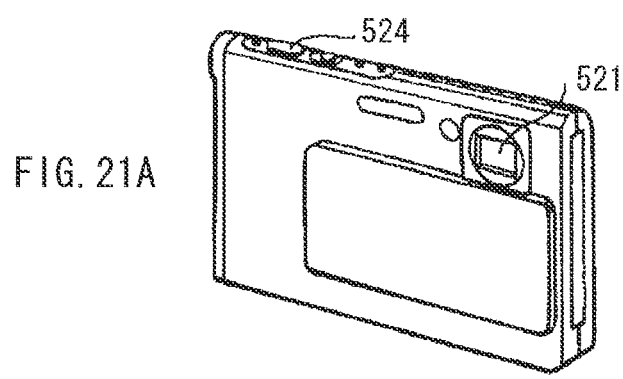
FIGS. 21A and 21B are perspective views each illustrating a configuration of an appearance of an application example 2.
Figure 21B:
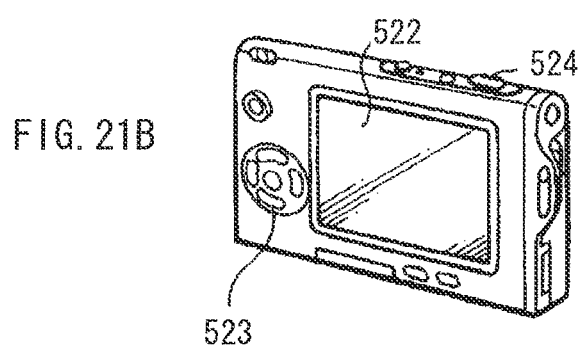

FIGS. 21A and 21B each illustrate an external view of a digital camera to which the display panel with a touch detection function in any of the embodiment and the like is applied. This digital camera includes, for example, a flash emitting section 521, a display section 522, a menu switch 523, and a shutter release 524, and the display section 522 is configured using the display panel with a touch detection function according to any of the embodiment and the like.

Application Example 3

Figure 22:
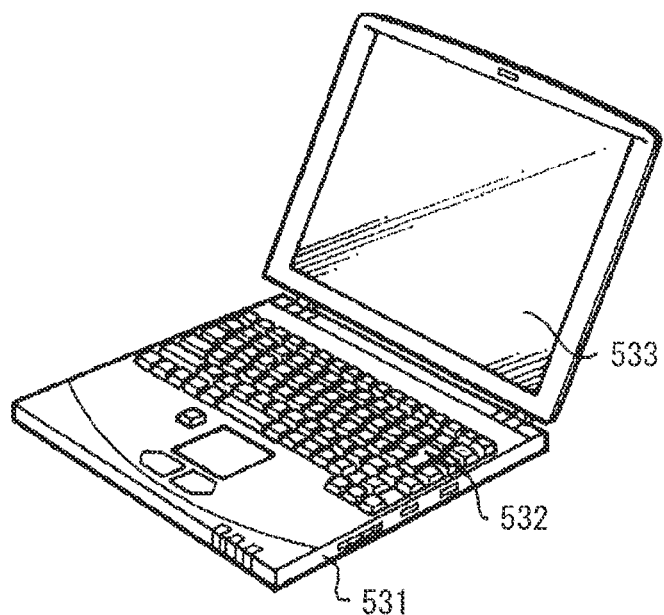
FIG. 22 is a perspective view illustrating a configuration of an appearance of an application example 3.

FIG. 22 illustrates an external view of a laptop computer to which the display panel with a touch detection function in any of the embodiment and the like is applied. This laptop computer includes, for example, a main section 531, a keyboard 532 for entering characters and the like, and a display section 533 that displays an image. The display section 533 is configured using the display panel with a touch detection function according to any of the embodiment and the like.

Application Example 4

Figure 23:
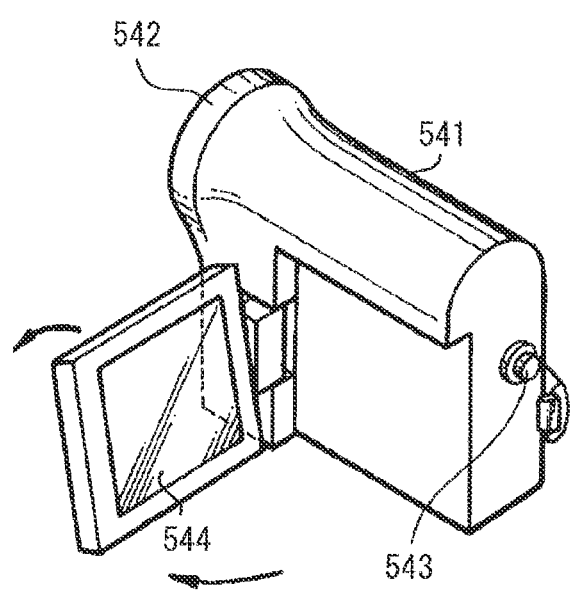
FIG. 23 is a perspective view illustrating a configuration of an appearance of an application example 4.
Figure 24:
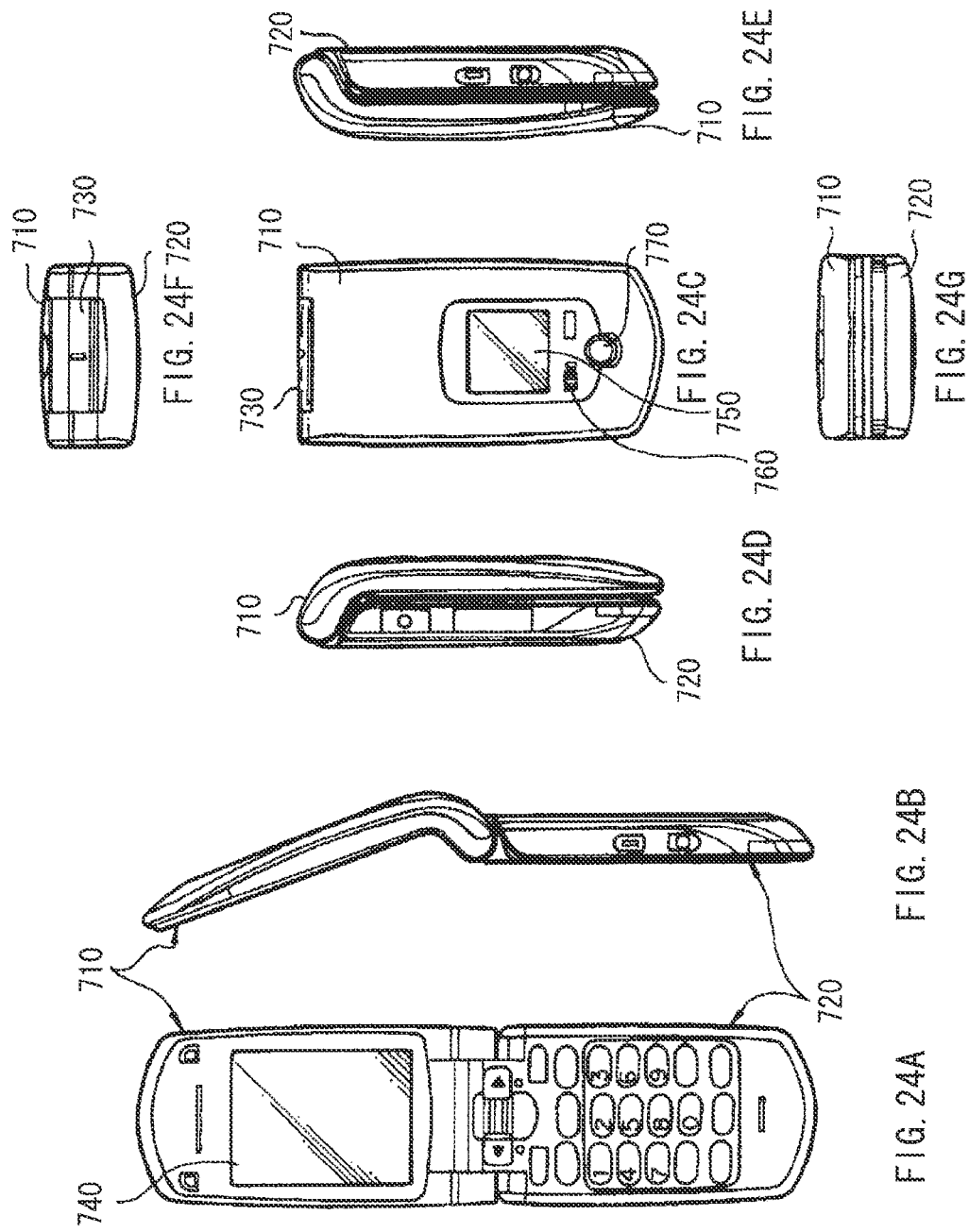
FIGS. 24A to 24G are front views, side views, a top view, and a bottom view each illustrating a configuration of an appearance of an application example 5.

FIG. 23 illustrates an external view of a video camera to which the display panel with a touch detection function in any of the embodiment and the like is applied. This video camera includes, for example, a main section 541, a lens 542 disposed on a front face of this main section 541 to shoot an image of a subject, a start/stop switch 543 used at the time of shooting, and a display section 544. The display section 544 is configured using the display panel with a touch detection function according to any of the embodiment and the like.

Application Example 5

FIGS. 24A to 24G illustrate external views of a portable telephone to which the display panel with a touch detection function in any of the embodiment and the like is applied. This portable telephone is, for example, a device in which an upper housing 710 and a lower housing 720 are connected by a coupling section (hinge section) 730, and includes a display 740, a sub-display 750, a picture light 760, and a camera 770. The display 740 or the sub-display 750 is configured using the display panel with a touch detection function according to any of the embodiment and the like.

Up to this point, the present technology has been described by using the embodiment and modifications, as well as the application examples of electronic units, but is not limited to these embodiment and like, and may be variously modified.

Figure 25:
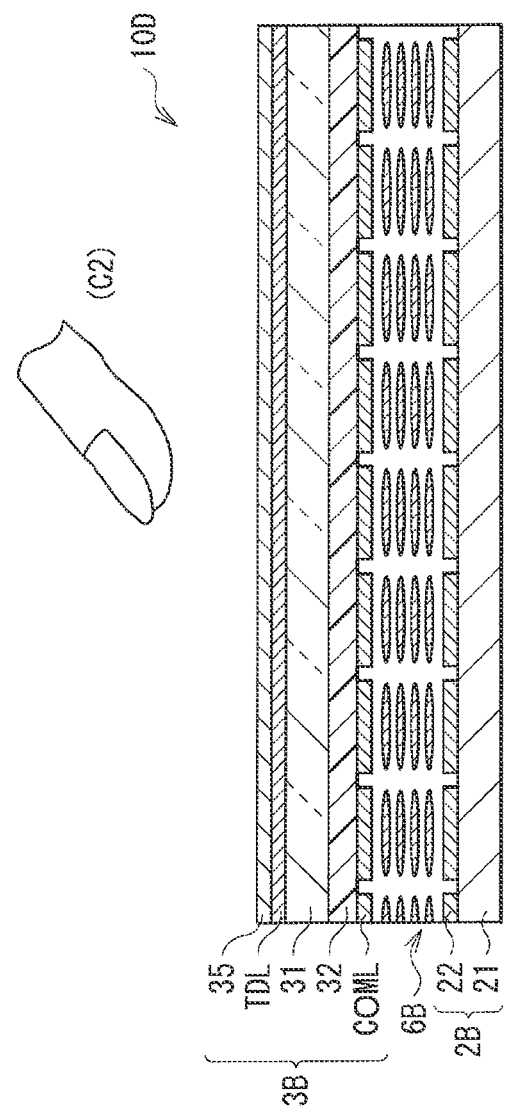
FIG. 25 is a cross-sectional diagram illustrating a schematic sectional structure of a display device with a touch detection function according to a modification.

For example, in the embodiment and like, the liquid crystal display device configured by using the liquid crystal in the transverse electric field mode such as FFS and IPS, and the touch detection device are integrated. However, instead, a liquid crystal display device using a liquid crystal in various modes such as TN (Nematic Twisted), VA (Vertical Alignment), and ECB (Electrically Controlled Birefringence), and a touch detection device may be integrated. When such a liquid crystal is used, the display device with a touch detection function may be configured as illustrated in FIG. 25. FIG. 25 illustrates an example of a cross-sectional structure of a main part in a display device 10D with a touch detection function according to the present modification, and illustrates a state in which a liquid crystal 6B is held between a pixel board 2B and an opposite board 3B. Names, functions, and the like of all other elements are similar to those in the case of FIG. 6 and thus, the description will be omitted. In this example, unlike the case of FIG. 6, drive electrodes COML used for both display and touch detection are formed at the opposite board 3B.

Further, for example, in each of the embodiment and the like, there is employed the so-called in-cell type in which the liquid crystal display device and the capacitance-type touch detection device are integrated, but this is not a limitation. Instead, for example, there may be employed a so-called on-cell type in which a capacitance-type touch detection device is formed on a surface of a liquid crystal display device. In the on-cell type, for example, it is conceivable that when a noise of display driving is transmitted from the liquid crystal display device to the touch detection device, the liquid crystal display device and the touch detection device may be operated in synchronization with each other. In this case, as in the embodiment and the like, changing the length of a horizontal period makes it possible to change a sampling frequency of touch detection operation, while display operation and touch detection operation are kept synchronized with each other, and it is possible to suppress an influence caused by a disturbance noise.

Furthermore, for example, in the above-described embodiment and the like, the touch detection device is of capacitance type, but is not limited thereto, and may be of, for example, optical type, resistive type, or the like, instead.

Moreover, for example, in the above-described embodiment and the like, the display element is the liquid crystal element, but is not limited thereto, and may be, for example, an EL (Electro Luminescence) element.

It is to be noted that this present technology may be configured as follows.

(1) A display panel with a touch detection function, the display panel including:
a signal generation section selecting one pulse period from a plurality of pulse periods prepared beforehand, and generating a synchronization signal including a series of pulses appearing at the selected pulse period;
a display section performing display based on the synchronization signal; and
a touch detection section performing touch detection operation based on the synchronization signal.

(2) The display panel according to (1), wherein the display section performs display for one screen in a pulse duration in which the series of pulses continues.

(3) The display panel according to (2), wherein the touch detection section performs the touch detection operation in the pulse duration.

(4) The display panel according to (3), wherein the touch detection section performs the touch detection operation, also in a blanking period other than the pulse duration.

(5) The display panel according to (4), wherein the pulse duration is equal to or shorter than a predetermined length.

(6) The display panel according to any one of (1) to (5), wherein the pulse period is set by a clock count of a base clock, and the signal generation section changes the pulse period by changing a clock frequency of the base clock.

(7) The display panel according to any one of (1) to (6), wherein the signal generation section selects the pulse period based on a detection result in the touch detection section.

(8) The display panel according to any one of (2) to (5), wherein the pulse duration is included in a frame period based on an image signal supplied.

(9) The display panel according to any one of (1) to (8), further including:
a plurality of drive electrodes arranged side by side to extend in one direction;
a detection electrode arranged side by side to extend in a direction intersecting the drive electrode;
a plurality of pixel electrodes; and
a display element performing display based on a voltage of the drive electrode and a voltage of the pixel electrode,
wherein, based on the synchronization signal, the display section performs display by driving and thereby sequentially scanning a plurality of the display elements per a plurality of the display elements corresponding to each of the drive electrodes, and
at timing synchronized with the synchronization signal, the touch detection section sequentially applies a drive signal to the plurality of drive electrodes, and detects a touch event based on a detection signal outputted from the detection electrode.

(10) The display panel according to (9), wherein the plurality of drive electrodes form a plurality of drive electrode blocks each including a predetermined number of the drive electrodes, and
the touch detection section applies the drive signal to each of the drive electrode blocks, for each drive period including a predetermined number of the pulse periods.

(11) The display panel according to (10), wherein the touch detection section allows the drive period to be long, when the pulse duration is equal to or shorter than a predetermined length.

(12) A method of driving a display panel with a touch detection function, the method including:
selecting one pulse period from a plurality of pulse periods prepared beforehand, and generating a synchronization signal including a series of pulses appearing at the selected pulse period;
performing display for one screen, and performing touch detection operation, based on the series of pulses of the synchronization signal; and
switching display of a screen, for each predetermined frame period.

(13) A drive circuit including:
a signal generation section selecting one pulse period from a plurality of pulse periods prepared beforehand, and generating a synchronization signal including a series of pulses appearing at the selected pulse period;
a display drive section driving a display panel based on the synchronization signal; and
a touch-detection drive section driving a touch panel based on the synchronization signal.

(14) An electronic unit including a display panel with a touch detection function, and a control section performing operation control using the display panel, the display panel including:
a signal generation section selecting one pulse period from a plurality of pulse periods prepared beforehand, and generating a synchronization signal including a series of pulses appearing at the selected pulse period;
a display section performing display based on the synchronization signal; and
a touch detection section performing touch detection operation based on the synchronization signal.

It should be understood by those skilled in the art that various modifications, combinations, sub-combinations and alterations may occur depending on design requirements and other factors insofar as they are within the scope of the appended claims or the equivalents thereof.

What is claimed is:

1. A display panel with a touch detection function, the display panel comprising:
a signal generation section selecting one pulse period from a plurality of pulse periods prepared beforehand, and generating a synchronization signal including a series of pulses appearing at the selected pulse period;
a display section performing display based on the synchronization signal;
a touch detection section performing touch detection operation based on the synchronization signal; and
a signal processing section configured to change the pulse period of a pulse included in the synchronization signal upon detecting a presence or absence of a disturbance noise.

2. The display panel according to claim 1, wherein the display section performs display for one screen in a pulse duration in which the series of pulses continues.

3. The display panel according to claim 2, wherein the touch detection section performs the touch detection operation in the pulse duration.

4. The display panel according to claim 3, wherein the touch detection section performs the touch detection operation, also in a blanking period other than the pulse duration.

5. The display panel according to claim 4, wherein the pulse duration is equal to or shorter than a predetermined length.

6. The display panel according to claim 1, wherein the pulse period is set by a clock count of a base clock, and
the pulse period is changed by changing a clock frequency of the base clock.

7. The display panel according to claim 1, wherein the signal generation section selects the pulse period based on a detection result in the touch detection section.

8. The display panel according to claim 2, wherein the pulse duration is included in a frame period based on an image signal supplied.

9. The display panel according to claim 1, further comprising:
a plurality of drive electrodes arranged side by side to extend in one direction;
a detection electrode arranged side by side to extend in a direction intersecting the drive electrode;
a plurality of pixel electrodes; and
a display element performing display based on a voltage of the drive electrode and a voltage of the pixel electrode,
wherein, based on the synchronization signal, the display section performs display by driving and thereby sequentially scanning a plurality of the display elements per a plurality of the display elements corresponding to each of the drive electrodes, and at timing synchronized with the synchronization signal, the touch detection section sequentially applies a drive signal to the plurality of drive electrodes, and detects a touch event based on a detection signal outputted from the detection electrode.

10. The display panel according to claim 9, wherein the plurality of drive electrodes form a plurality of drive electrode blocks each including a predetermined number of the drive electrodes, and the touch detection section applies the drive signal to each of the drive electrode blocks, for each drive period including a predetermined number of the pulse periods.

11. The display panel according to claim 10, wherein the touch detection section allows the drive period to be long, when the pulse duration is equal to or shorter than a predetermined length.

12. A method of driving a display panel with a touch detection function, the method comprising:

selecting one pulse period from a plurality of pulse periods prepared beforehand, and generating a synchronization signal that includes a series of pulses appearing at the selected pulse period;

performing display for one screen, and performing touch detection operation, based on the series of pulses of the synchronization signal;

switching display of a screen, for each predetermined frame period; and changing the pulse period of a pulse included in the synchronization signal upon detecting a presence or absence of a disturbance noise.

13. A drive circuit comprising:

a signal generation section selecting one pulse period from a plurality of pulse periods prepared beforehand, and generating a synchronization signal that includes a series of pulses appearing at the selected pulse period;

a display drive section driving a display panel based on the synchronization signal;

a touch-detection drive section driving a touch panel based on the synchronization signal; and a signal processing section configured to change the pulse period of a pulse included in the synchronization signal upon detecting a presence or absence of a disturbance noise.

14. An electronic unit including a display panel with a touch detection function, and a control section performing operation control using the display panel, the display panel comprising:

a signal generation section selecting one pulse period from a plurality of pulse periods prepared beforehand, and generating a synchronization signal including a series of pulses appearing at the selected pulse period;

a display section performing display based on the synchronization signal;

a touch detection section performing touch detection operation based on the synchronization signal; and a signal processing section configured to change the pulse period of a pulse included in the synchronization signal upon detecting a presence or absence of a disturbance noise.

\* \* \* \* \*